United States Patent
Al-Aqeeli et al.

(10) Patent No.: US 11,308,436 B2
(45) Date of Patent: Apr. 19, 2022

(54) WEB-INTEGRATED INSTITUTIONAL RESEARCH ANALYTICS PLATFORM

(71) Applicant: KING FAHD UNIVERSITY OF PETROLEUM AND MINERALS, Dhahran (SA)

(72) Inventors: Nasser Mohammed Al-Aqeeli, Dhahran (SA); Musab Ahmed Alturki, Dhahran (SA); Hamdi Ali Al-Jamimi, Dhahran (SA); Imran ul Haq, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/821,134

(22) Filed: Mar. 17, 2020

(65) Prior Publication Data
US 2021/0295222 A1 Sep. 23, 2021

(51) Int. Cl.
*G06Q 10/06* (2012.01)

(52) U.S. Cl.
CPC ... *G06Q 10/0637* (2013.01); *G06Q 10/06393* (2013.01)

(58) Field of Classification Search
CPC ............ G06Q 10/0637; G06Q 10/06393
See application file for complete search history.

(56) References Cited

U.S. PATENT DOCUMENTS

| | | | |
|---|---|---|---|
| 6,853,952 B2 * | 2/2005 | Chadwick | G06Q 10/10 702/181 |
| 7,206,789 B2 | 4/2007 | Hurmiz et al. | |

(Continued)

FOREIGN PATENT DOCUMENTS

CN 108960627 A 12/2018

OTHER PUBLICATIONS

Marcel et al. "Citation metrics as an additional indicator for evaluating research performance? An analysis of their correlations and validity", Feb. 2017, Business Research pp. 249-279. (Year: 2017).*

(Continued)

*Primary Examiner* — Romain Jeanty
(74) *Attorney, Agent, or Firm* — Oblon, McClelland, Maier & Neustadt, L.L.P.

(57) ABSTRACT

A research analytics system and method, includes an Internet-based data storage service maintaining, using an integrated database scheme, standardized research process flows, organizational tasks, and research outcomes for a plurality of research programs. The system maintains definitions of research performance indicators, identifies targets for the research performance indicators that are aligned with goals associated with a research organization, maps performance-related data from various data sources to the integrated database scheme and stores the standardized research process flows, the organizational tasks, and the research outcomes, grouped by the research programs. The system determines values of the research performance indicators using metrics, displays the research performance indicator values and associated targets, performs analysis using the stored performance-related data in order to determine an affect of the performance-related data for the research programs on the research performance indicator values, and adjusts the research performance indicators and the targets.

20 Claims, 27 Drawing Sheets

(56) References Cited

U.S. PATENT DOCUMENTS

| | | | |
|---|---|---|---|
| 7,885,900 | B1 | 2/2011 | Bender |
| 7,937,303 | B2 | 5/2011 | Kobeh et al. |
| 9,198,621 | B2 | 12/2015 | Fernstrom et al. |
| 10,366,781 | B1* | 7/2019 | Menon ............... G16H 40/63 |
| 2002/0169771 | A1 | 11/2002 | Melmon et al. |
| 2005/0097123 | A1 | 5/2005 | Baek |
| 2006/0149578 | A1* | 7/2006 | Weild ............. G06Q 10/063112 705/7.14 |
| 2009/0299760 | A1* | 12/2009 | Spradlin ............. G06Q 50/184 705/310 |
| 2011/0029890 | A1 | 2/2011 | Cosgrove |
| 2012/0023218 | A1 | 1/2012 | Journeau et al. |
| 2012/0041769 | A1 | 2/2012 | Dalal et al. |
| 2013/0204671 | A1* | 8/2013 | Weertman ............ G06Q 10/0637 705/7.36 |
| 2013/0218801 | A1 | 8/2013 | Rago |
| 2014/0058782 | A1 | 2/2014 | Graves, Jr. |
| 2014/0142968 | A1* | 5/2014 | Harmon Blumenfeld ................. G06Q 10/06393 705/2 |
| 2016/0005112 | A1 | 1/2016 | Rogosnitzky |
| 2017/0046374 | A1* | 2/2017 | Fletcher ............... G06F 3/0482 |
| 2018/0039731 | A1* | 2/2018 | Szeto .................. G16B 20/00 |
| 2019/0311788 | A1* | 10/2019 | Beltre ................. G16H 10/20 |

OTHER PUBLICATIONS

Mohammed et al "A Survey on Exploring Key Performance Indicators", Dec. 2016, Futuring Computing and Informatics Journal, pp. 47-52 (Year: 2016).*

"InCites: Analyze institutional productivity and benchmark your output against peers worldwide", CLARIVATE, https://clarivate.com/products/incites/, Jun. 25, 2019, 8 pages.

"My Organization for Incites Benchmarking & Analytics", CLARIVATE, https://clarivate.com/products/incites/my-organization, Jun. 25, 2019, 7 pages.

"A Platform for Institutional Effectiveness", MICROSOFT, www.microsoft.com/education/en-us/solutions/Pages/institutional_effectiveness.aspx, Jul. 2011, 27 pages.

* cited by examiner

WEB-INTEGRATED INSTITUTIONAL RESEARCH ANALYTICS PLATFORM

BACKGROUND

Technical Field

The present disclosure is directed to an institutional research analytics platform, and in particular a platform for an information system that maintains key performance indicators for research, and a method and system for organizing, prioritizing and rating institutional research.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Typically, higher educational institutions, research institutions, and other research organizations engage in research activities to achieve both institutional and governmental goals. For higher education institutions, such research activities are carried out by researchers and faculty who are involved in various other duties such as teaching and administration. For employers of research institutions, such research activities are performed by employees and other personnel resources. The research activities lead to outcomes that may have associated performance indicators. Large multidisciplinary universities require collecting huge amounts of information from multiple heterogeneous sources in specific sequences relative to one another to achieve the institutional goals of the university. In order to manage research activities, research organizations often perform information gathering and process tasks to describe the research activities. Such descriptions of research activities are referred to as process flows. The process flows may characterize the research activities, the performance indicators, or institutional goals.

Higher educational institutions and research institutions use different systems to generate, store and analyze research information. Higher education institutions such as universities commonly store research information by using data repositories associated with various independent information retrieval systems. Such independent information retrieval systems are designed according to pre-defined research activities, and later adapted to an institutional structure that includes research centers, academic colleges, departments, and other units such as laboratories.

However, such independent systems do not track research data and lack data integrity and consistency. Moreover, the independent systems are exposed to duplication of development efforts, and lack system communication. Furthermore, the design of these independent systems is restricted to a level in the institutional structure. Thus, such information retrieval systems are not suitable for research data analytics and management of the institutional organization.

It is one object of the present disclosure to describe an institutional research analytics platform (TRAP) as a decision support system that provides automatic and comprehensive analytics, measurement, and evaluation for a research organization. The IRAP provides simple user interfaces, and a facility for higher ranked managers to make informed decisions. The TRAP tracks, captures, analyzes, and integrates all research outcomes from multiple sources of its predesignated users. Subsequently, the TRAP system performs a method for analyzing detailed insights by retrieving information from independent heterogeneous databases.

SUMMARY

In an exemplary embodiment, a research analytics system, including an Internet service having a data storage service maintaining, using an integrated database scheme, standardized research process flows, organizational tasks, and research outcomes for a plurality of research programs; a server having processing circuitry; a client device. The processing circuitry configured to: maintain definitions of research performance indicators, identify targets for the research performance indicators that are aligned with goals associated with a research organization, map performance-related data from various data sources to the integrated database scheme and store in the data storage service the standardized research process flows, the organizational tasks, and the research outcomes, grouped by the research programs, calculate research metrics based on the performance-related data, determine values of the research performance indicators using the metrics, display to the client device the research performance indicator values and the associated targets, perform analysis using the stored performance-related data in order to determine an affect of the performance-related data for the research programs on the research performance indicator values, display to the client device an interface for adjusting the research performance indicators and the targets based on the analysis, and adjust the research performance indicators and the targets.

A method for a research analytics system, including maintaining, using an integrated database scheme in a data storage service, standardized research process flows, organizational tasks, and research outcomes for a plurality of research programs; maintaining, by processing circuitry, definitions of research performance indicators; identifying targets for the research performance indicators that are aligned with goals associated with a research organization; mapping, by the processing circuitry, performance-related data from various data sources to the integrated database scheme and storing in the data storage service the standardized research process flows, the organizational tasks, and the research outcomes, grouped by the research programs; calculating, by the processing circuitry, research metrics based on the performance-related data; determining, by the processing circuitry, values of the research performance indicators using the metrics; displaying to a client device the research performance indicator values and the associated targets; performing, by the processing circuitry, analysis using the stored performance-related data in order to determine an affect of the performance-related data for the research programs on the research performance indicator values; displaying to the client device an interface for adjusting the research performance indicators and the targets based on the analysis; and adjusting, by the processing circuitry, the research performance indicators and the targets.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
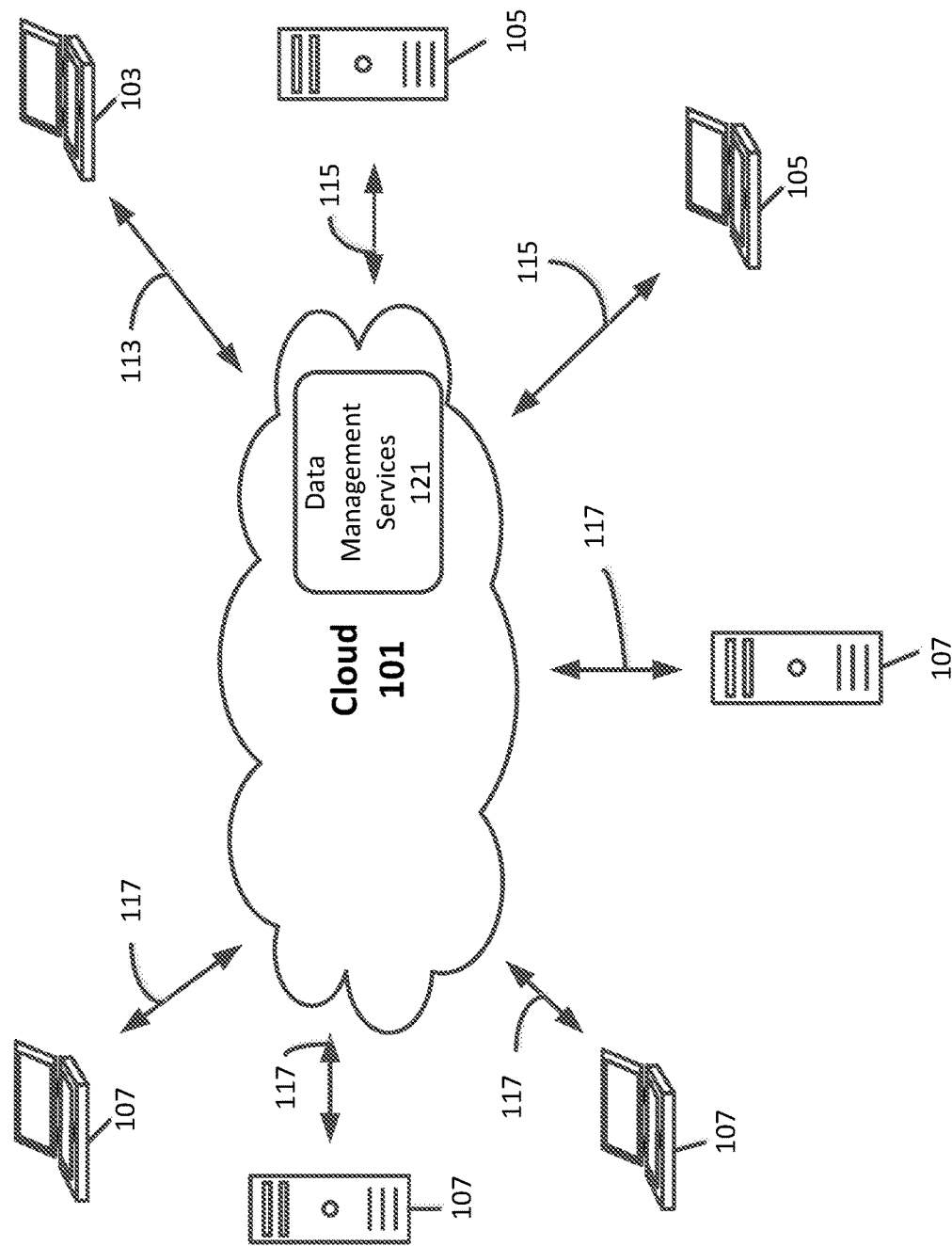
FIG. 1 shows a cloud-based system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to a Web-based integrated institutional research analytics platform (IRAP) that includes a research project management system (Institution Management), a research grant system (Research Sponsors), and a research tracking system (Research Project). In other words, the IRAP involves users including institutional managers, research sponsors and those that secure and carry out a research project. In order to enable interfacing by these users, the IRAP performs a method for retrieving detailed insights and information from independent heterogeneous databases and integrating the detailed insights and information into a database having an integrated schema. The method includes the following steps: (a) determining the criteria of search; (b) fetching performance-related data related to the research activities; (c) assigning a categorical tag to each of the collected elements; and (d) mapping the raw fetched data to IRAP structures and the database schema.

FIG. 1 is a diagram for an architecture for the integrated research analytics platform. The architecture includes four main components, including one or more research computers 105, one or more management workstations 103, one or more sponsor devices 107, and a cloud network 101. The one or more research computers 105 are utilized to perform research activities. The management workstation 103 may generate and display knowledge information related to performance at the institution level. Sponsor devices 107 may be provided with access to some of the knowledge information. The cloud network 101 facilitates data exchange between the research computers 105, management workstation 103, and sponsor devices 107 as devices that store and share data by way of data management services 121 in the cloud 101.

The sponsor devices 107 are third-party devices that have access to some of the research performance knowledge for various purposes such as monitoring status of research projects and viewing values of specific research performance indicators for the projects.

The cloud network 101 facilitates actions performed by sponsor devices 107 and commands from a management workstation 103. Some of the data stored in the data management services 121 may be retrieved by the sponsor devices 107, the research computers 105 and the management workstation 103.

Figure 2:
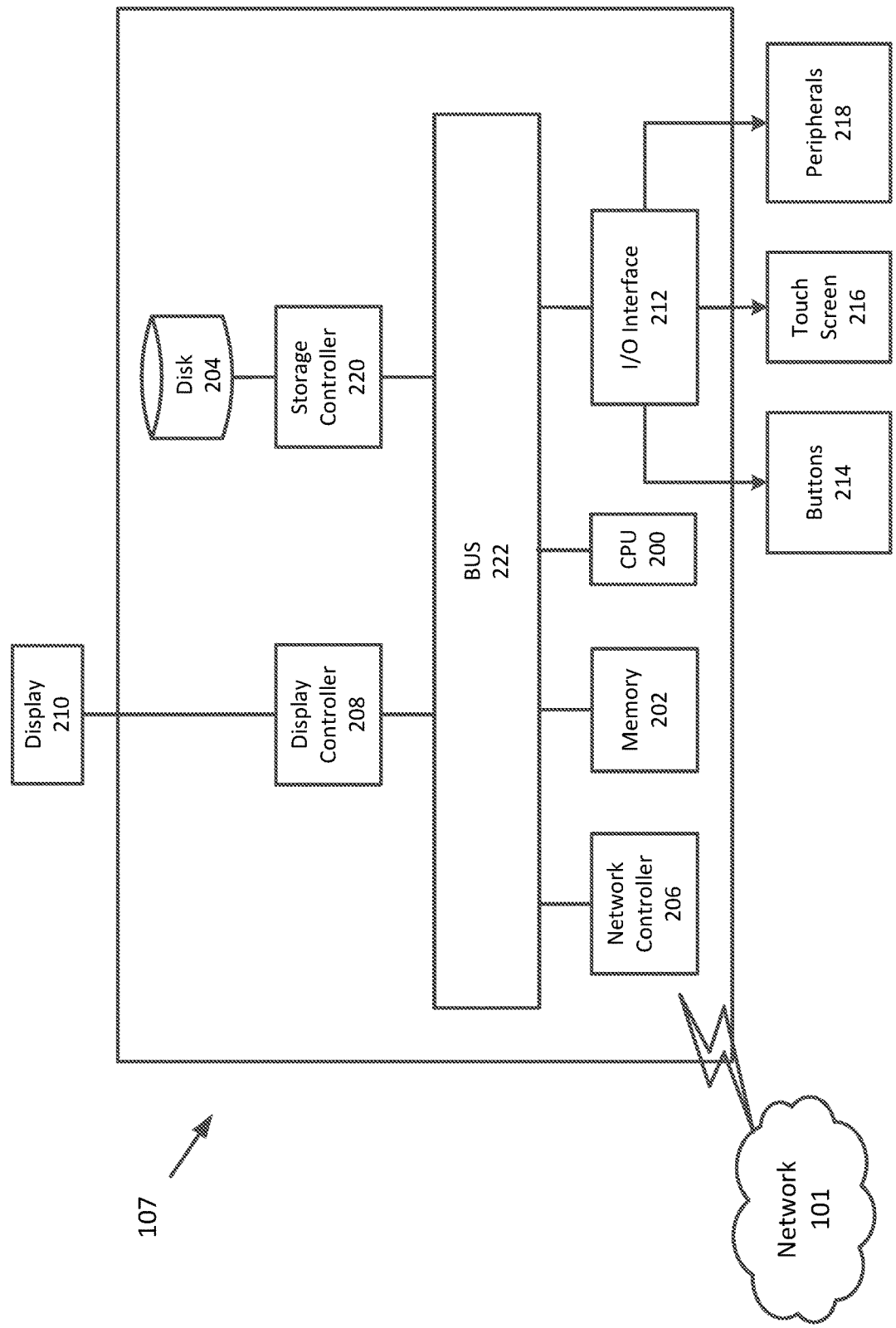
FIG. 2 is a block diagram of a computer system for interacting with the cloud-based system in accordance with an exemplary aspect of the disclosure.
Figure 3:
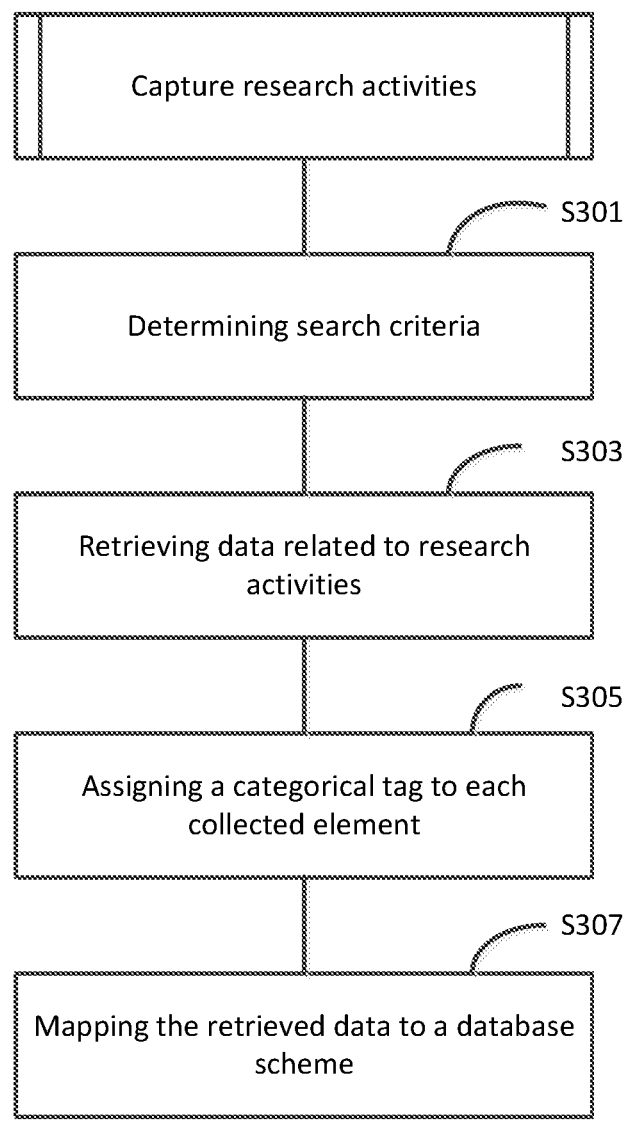
FIG. 3 is a flowchart of capturing research performance data in accordance with an exemplary aspect of the disclosure.

In one implementation, the functions and processes of the research computers 103, sponsor devices 107 and management workstation 103 may each be implemented by a computer system. Next, a hardware description of the computer system according to exemplary embodiments is described with reference to FIG. 2. In FIG. 2, the computer system includes a CPU 200 which performs the Web-based processes described herein. The process data and instructions may be stored in memory 202. These processes and instructions may also be stored on a storage medium disk 204 such as a hard drive (HDD) or portable storage medium or may be stored remotely. Further, the processes are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server or computer.

Further, the processes may be provided as a utility application, background daemon, or component of an operating system, or combination thereof, executing in conjunction with CPU 200 and an operating system such as Microsoft® Windows®, UNIX®, Oracle® Solaris, LINUX®, Apple macOS® and other systems known to those skilled in the art.

In order to achieve the computer system, the hardware elements may be realized by various circuitry elements, known to those skilled in the art. For example, CPU 200 may be a Xenon® or Core® processor from Intel Corporation of America or an Opteron® processor from AMD of America, or may be other processor types that would be recognized by one of ordinary skill in the art. Alternatively, the CPU 200 may be implemented on an FPGA, ASIC, PLD or using discrete logic circuits, as one of ordinary skill in the art would recognize. Further, CPU 200 may be implemented as multiple processors cooperatively working in parallel to perform the instructions of the inventive processes described above.

The computer system in FIG. 2 also includes a network controller 206, such as an Intel Ethernet PRO network interface card from Intel Corporation of America, for interfacing with network 101. As can be appreciated, the network 101 can be a public network, such as the Internet, or a private network such as LAN or WAN network, or any combination thereof and can also include PSTN or ISDN sub-networks. The network 101 can also be wired, such as an Ethernet network, or can be wireless such as a cellular network including EDGE, 3G, 4G and 5G wireless cellular systems. The wireless network can also be WiFi®, Bluetooth®, or any other wireless form of communication that is known.

The computer system further includes a display controller 208, such as a NVIDIA® GeForce® GTX or Quadro® graphics adaptor from NVIDIA Corporation of America for interfacing with display 210, such as a Hewlett Packard® HPL2445w LCD monitor. A general purpose I/O interface 212 interfaces with a keyboard and/or mouse 214 as well as an optional touch screen panel 216 on or separate from display 210. General purpose I/O interface also connects to a variety of peripherals 218 including printers and scanners, such as an OfficeJet® or DeskJet® from Hewlett Packard®.

The general purpose storage controller 220 connects the storage medium disk 204 with communication bus 222, which may be an ISA, EISA, VESA, PCI, or similar, for interconnecting all of the components of the computer system. A description of the general features and functionality of the display 210, keyboard and/or mouse 214, as well as the display controller 208, storage controller 220, network controller 206, and general purpose I/O interface 212 is omitted herein for brevity as these features are known.

University research institutions may consist of research centers, academic colleges, departments, and other units. In multidisciplinary research, members of different departments or academic colleges may be assigned to one or more research centers. Thus, expenses associated with the members of research centers may need to be determined based on factors such as level of effort, time spent at a research center, an agreed upon income, and/or space occupied in a laboratory. Further, technologies may be shared between departments, academic colleges and/or research centers. Other expenses and investments may be shared. Results of research, such as scientific publications, projects, new products, or patents may involve the members from various departments or academic colleges. As such performance indicators for a research project, a department, and the entire research institution have potential to be very complicated due to common human resources, shared technologies and interrelated expenses in a multidisciplinary environment.

The multidisciplinary environment IRAP system captures information on research performance by retrieving information from independent heterogeneous databases and analyzing detailed insights. In this aspect, the method of retrieving information performed by the system includes steps of: (a) S301, determining the criteria of search for activities related to research; (b) S303, fetching the data related to the research activities; S305, assigning a categorical tag to each of the collected data elements; and (d) S307, mapping the raw fetched data to IRAP structures and integrated schema for a relational database.

The integrated schema for the relational database is a formal description of the structure of a database: the names of the tables, the names of the columns of each table, and the data type and other attributes of each column. The relational database may contain multiple tables. Each table stores data about one specific subject. Fields in the tables contain data describing the subject of a table. Records in the tables are particular instances of the subject of a table. A primary key field uniquely identifies each record in a table.

Thus, the integrated schema defines fields that are populated with data from research activities of various research projects from multiple sources. Mapping data from multiple sources to the integrated schema ensures data integrity and consistency.

[Architecture]

Figure 4:
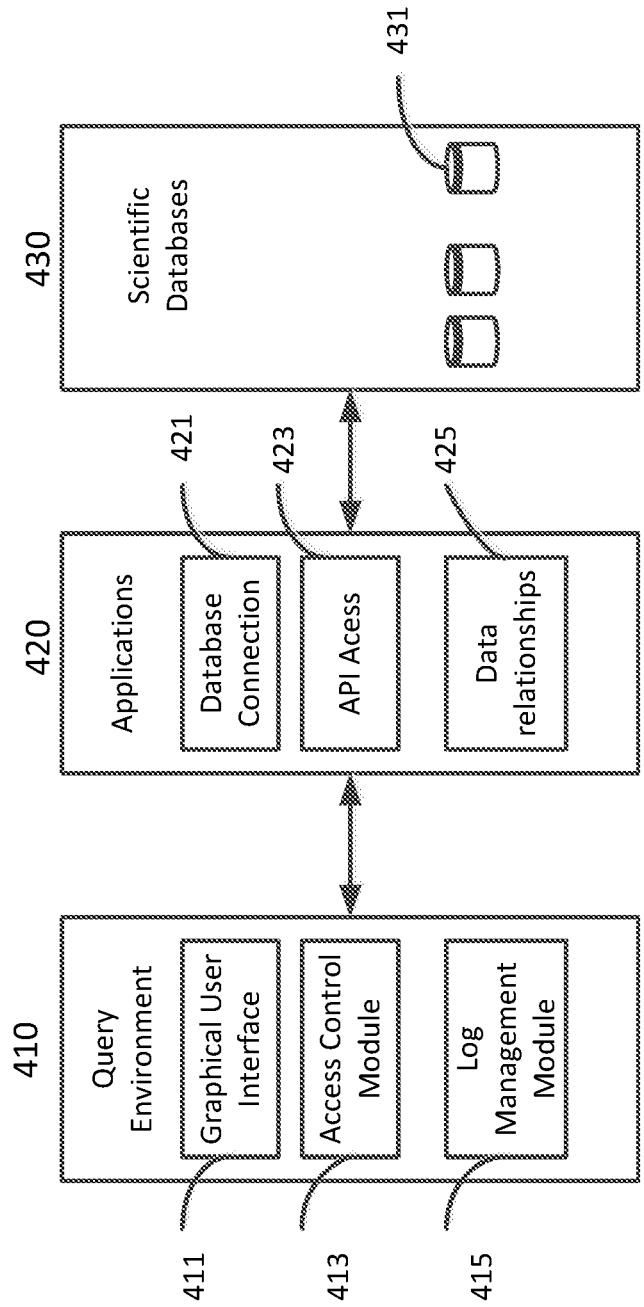
FIG. 4 is a block diagram of a query and information retrieval subsystem in accordance with an exemplary aspect of the disclosure.

The method and system of the invention is a research platform for multi-levels and multi-units of research institutions. The system allows linking the research platform to various knowledge-based sources. FIG. 4 is a schematic diagram of an overall architecture in accordance with an exemplary aspect of the disclosure. The architecture includes a query environment 410, an application layer 420, and a database layer 430.

The query environment 410 contains one or more program modules. For example, a log management module 415 incorporated into the database monitors logs access by various individuals to different information in the database layer 430. The log management module 415 generates one or more log entries in a user log indicating information relating to a search. The log entries are made to record each user's search activity including date and time of a search, query terms used in each search, the title of documents retrieved, and links followed. The modules are associated with the platform and can be interacted via a Web browser. An access control module 413 allows high level generic data stored in the scientific knowledge database 430 to be accessed by a first set of users (less authorized actors) and a second level of detailed data to be accessed by a second set of users (more authorized actors), where the second set of users are fewer than the first set of users.

The applications layer 420 preferably includes other executable procedures or methods. In the application layer 420, data relationships 425 among the different entities stored in different sources can be maintained via a pre-defined ID number for each entity or unit at different levels. An external interface module 421 may permit the interfacing of the system with a particular external server hosting a respective non-proprietary database. The interfacing can be provided via the Internet using the HTTP protocol. A proprietary interface module permits the interfacing of the system with a particular proprietary information system associated with a respective proprietary database. An API interface module 423 may translate general requests from the proprietary interface module to requests that are recognizable by the proprietary information system for accessing the proprietary database and for performing a search operation in accordance with the query to retrieve information from the proprietary database satisfying the particular query.

The database layer 430 may be referred to as a scientific knowledge database. The database layer 430 may include a relational database management system, with associated XML and/or other documents and information sources. Research information may be input into the database layer 430 through various media, either of the modules supported by the research platform to manage the research activities, links provided directly to other systems hosted in the institution, or Web services provided by external sources.

In some embodiments, executable computer code in the form of the user interface module 411 operates to supply the input screen and process information received from the input screen using well known techniques. Once the input is complete, the information/data are stored in a number of discreet fields within the database layer 430.

In some embodiments, various databases 431 make up the database layer 430 and may store resources including any of text books, bibliographic resources and journals or user provided databases (among others), that are searchable by the query and information retrieval sub-system 410. Advantageously, the system may be customized for a particular field of endeavor. For example, in an embodiment of the system tailored to the general medical field, the databases may include searchable resources including any of text books, bibliographic resources, journals, drug databases, national or local clinical guidelines, evidence-based medicine resources, patient information, drug formularies, policy information, procedure information, and educational information (among others).

The scientific knowledge database 430 to store research information, when organized in a relational database includes a set of entities, each entity specifying a scientific outcome. Various resources can be used to feed the data of research.

[Analysis]

Performing research and recording information related to research can result in a lot of data being stored in the scientific knowledge base 430. The various data itself may not be that useful for administrators that need performance measures to make action-oriented decisions. A research project may have an input, such as expenses, investments, human resources, and technologies, and may undergo a process, including concept generation, development, selection based on the development, and additional technology acquisition. The research project may have an output including scientific publications, patents, project completion, and new products. An outcome of a project may be a reduction in costs or product improvement. The input data, output data, and process data may be stored in a database system. However, the stored data needs to be analyzed to determine whether the project is meeting its goals. At a higher level, the stored data for several projects in a department needs to be integrated and analyzed to provide information on the performance of the department.

According to embodiments of the present invention, the analytics system collects data from different sources and uses different factors to link the data. The analytics system, then, determines, from the perspective of the researcher/unit/university, if the measured performance meets the expected target. The Institutional Research Analytics Platform provides a Web-integrated and computer-based tool to manage research expenditure and outcomes of a university and to ensure that they are consistent with the requirements of the various governmental policies and procedures under which it operates.

The present invention affords an information system that is simple to use, can be queried in a user-friendly manner, is capable of searching multiple resources in parallel to effect an efficient search, presents diverse information in an easy-to-comprehend format, and allows rapid and intuitive navigation among high-quality contextual information. The invention allows a user to enter a simple query, search all available sources in parallel (or alternatively select only those sources of interest), and navigate among the search results using an intuitive user-interface 411 to develop an action plan based on the resulting information.

Some of the data involved in the searching may be designated as performance-related data which are used in data-informed strategies including: (i) "research performance indicators" that present multi-level broad scoped stats of various research items (publications, patents, conferences etc.), (ii) "detailed insights" that provide multi-tiered statistics of research funding and outcomes, and (iii) various KPI reports of resources (researchers, publications, funding, resources) that assist higher administrators in making informed decisions.

The present invention includes a web-integrated system and method for managing and tracking research institutional key performance; and, more particularly, the present invention is an information management, data analytics and display system for institutional research outcomes through a simple and yet informative graphical display. It relates generally to institutional research organizations, research universities, and other organizational activities are collected for data research process flows. More specifically, the present invention relates to a system for managing process flow information and a multiplicity of interrelated organizational tasks.

As a result, a user takes information from several sources and that information is turned into action-oriented knowledge that can be applied to solve a particular problem. The amount of information available is secondary to the quality and relevance of the information and how readily it can be synthesized as knowledge by the user. The invention may also afford an educational aspect. For example a user could get professional credit for the review and application of the knowledge developed.

The Institutional Research Analytics Platform (TRAP) is a Web-based decision support system that provides automatic and comprehensive institution-wide research analytics, measurement, and evaluation of research activities for a research institution. The TRAP integrates outcomes from multiple sources. Each research project is provided with one or more research outcomes. A research project outcome may result from an input, a process, and an output. The input may involve human resources, computing resources, technologies, and expenses. The process flow may vary depending on the research project, and may include entities such as concept generation, product development, product selection, and technology acquisition. The output may be scientific publications, completion of a project, new products, patents and other forms of intellectual property. A research outcome may be a cost reduction or other improvement in a process, or an improvement of a product.

Figure 5:
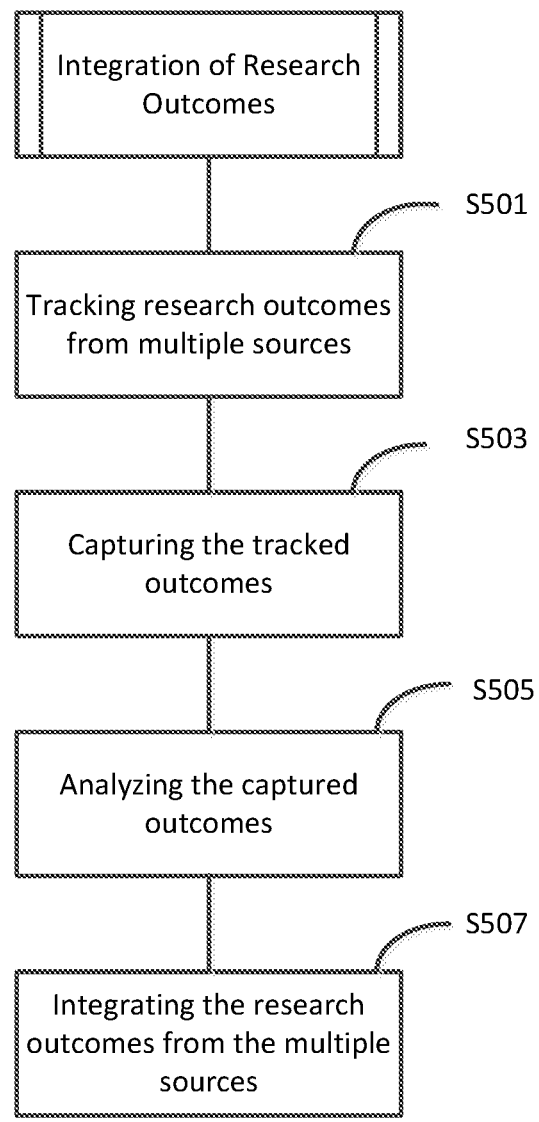
FIG. 5 is a flowchart of an organizational research analytics, evaluation, and measurement process in accordance with an exemplary aspect of the disclosure.

FIG. 5 is a flowchart of a method of integrating research outcomes in accordance with an exemplary aspect of the disclosure. In FIG. 5, the IRAP tracks research outcomes from multiple sources by retrieving information from multiple sources of its predesignated users (S501), captures the tracked outcomes (S503), analyzes the captured outcomes (S505), and integrates the research outcomes (S507).

[Integration]

Figure 6:
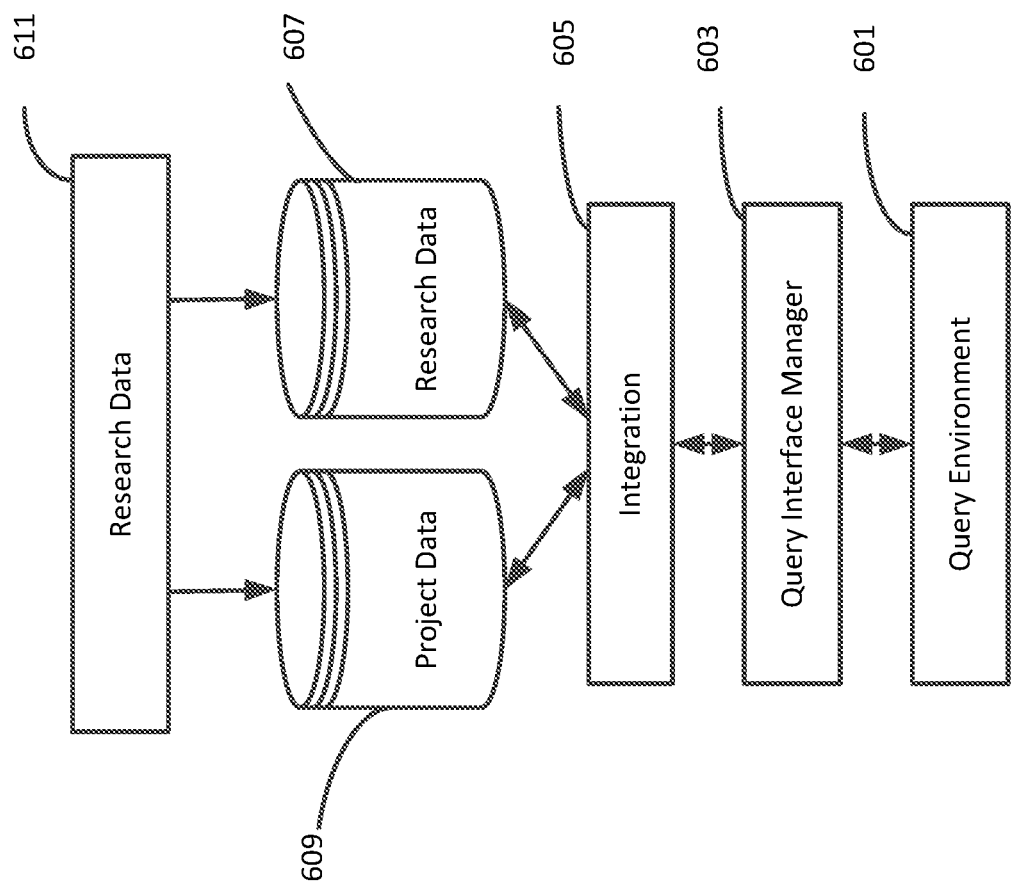
FIG. 6 is a block diagram of research data integration model in accordance with an exemplary aspect of the disclosure.

FIG. 6 illustrates the data integration model of the present invention. As mentioned above with regard to S505, an analysis may be performed using data obtained from various distributed sources. For example, research data 611 from other research programs may be analyzed. Data from all programs in a department may be consolidated and analyzed. A data integration model may be supported by a query and information retrieval subsystem 605 for integrating information across multiple databases, a search interface manager for mapping queries to a particular search syntax of a particular database, and a log recording sub-system to record system activity related to a search.

The research data 611 may be mapped to a project 609 or to a specific area of research 607. The project data and all areas of research that pertain to the project may be integrated.

The query and information retrieval subsystem 605 is configured for accessing the one or more databases 607, 609 and retrieving one or more documents from the databases that satisfy a particular query, and a search interface manager 603 for mapping the query to a particular search syntax for a particular database. The search interface manager 603 provides an environment for entering searches 601 and receiving search results.

Figure 7:
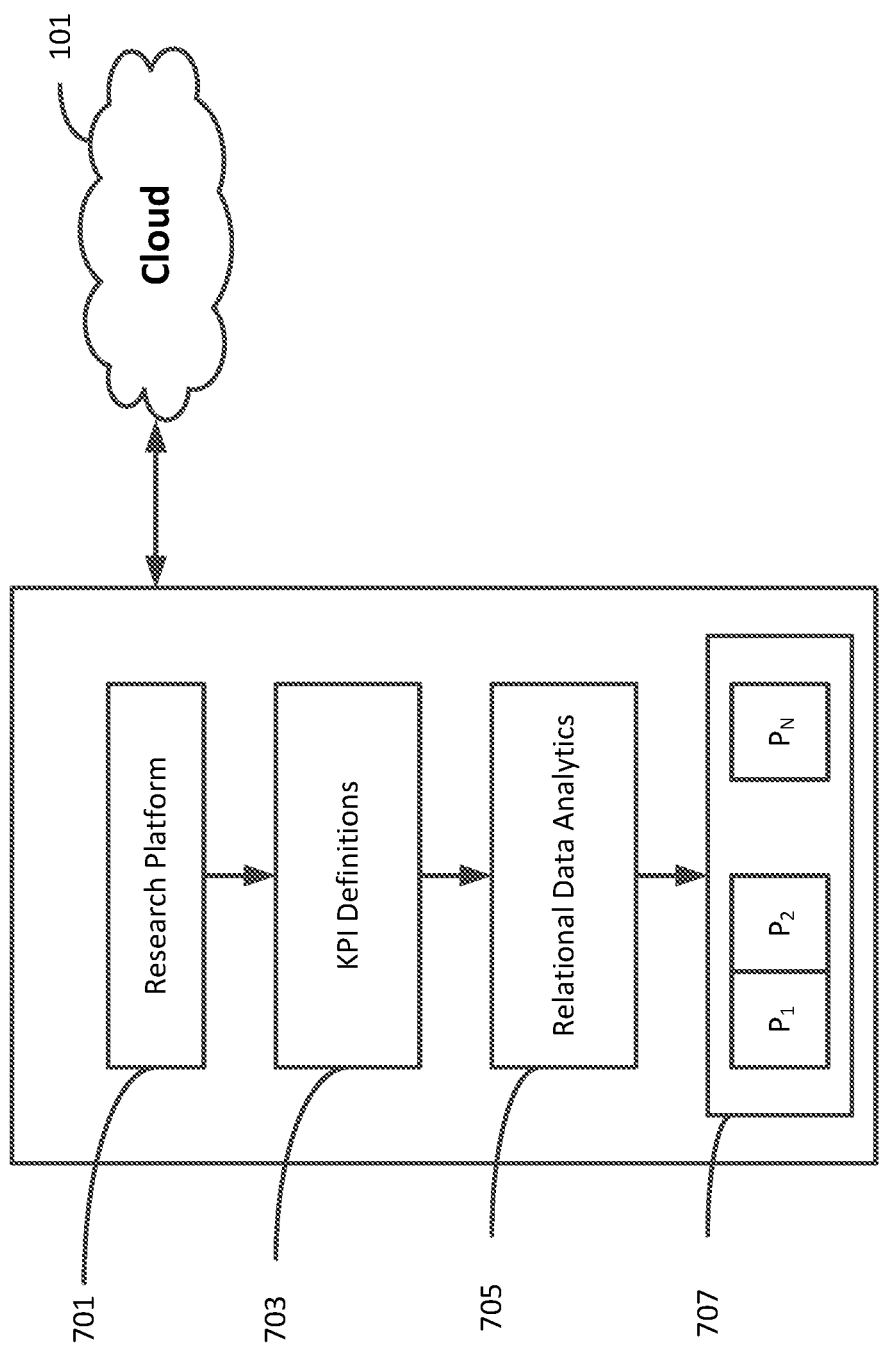
FIG. 7 is a block diagram of key performance measures model in accordance with an exemplary aspect of the disclosure.

FIG. 7 is a block diagram of a key performance measures model in accordance with an exemplary aspect of the disclosure. Performance indicators may be retrieved, for example, by eligible users accessing the database layer 430 using a research platform 701 through remote web services 101. A special purpose search form may be displayed. The search form may be supplied by the user interface module 410. The search form allows easier access and retrieval of the performance indicators from the database layer 430.

Research activities preferably result in outcomes that may have associated performance indicators. The performance indicators 707 may be derived based on multi-tiered broad scoped statistics of various research activities. For example, outcomes may include publications, patents, or conference presentations. The performance indicators may be set up with standard definitions 703 so that all research centers or all departments are measured by consistent performance measures. Sponsors will have a view of consistent performance measures that will aid in improving the research centers or departments of interest. Multi-level performance indicators may be defined for different levels of an organization. Multi-level performance indicators may be determined by applying analytics 605 to the retrieved performance data. High level performance indicators may be for overall performance of an organization. Low level performance indicators may be for processes in particular departments, or for particular researchers.

Performance indicators may be provided to department heads and managers for use in determining a plan of action.

[Performance Indicators]

Research performance indicators may include services developed, project completion, or products. Still further, performance indicators may include average cost reduction or product improvements.

In the case of research grants, research performance indicators may be for proposals, grant awards, or expenditures. A performance indicator of interest to tech transfer may include contract negotiation processing time. A performance indicator of interest to a sponsor may include grant award processing. A performance indicator of interest with respect to a research grant contract may include contract reporting.

Figure 8:
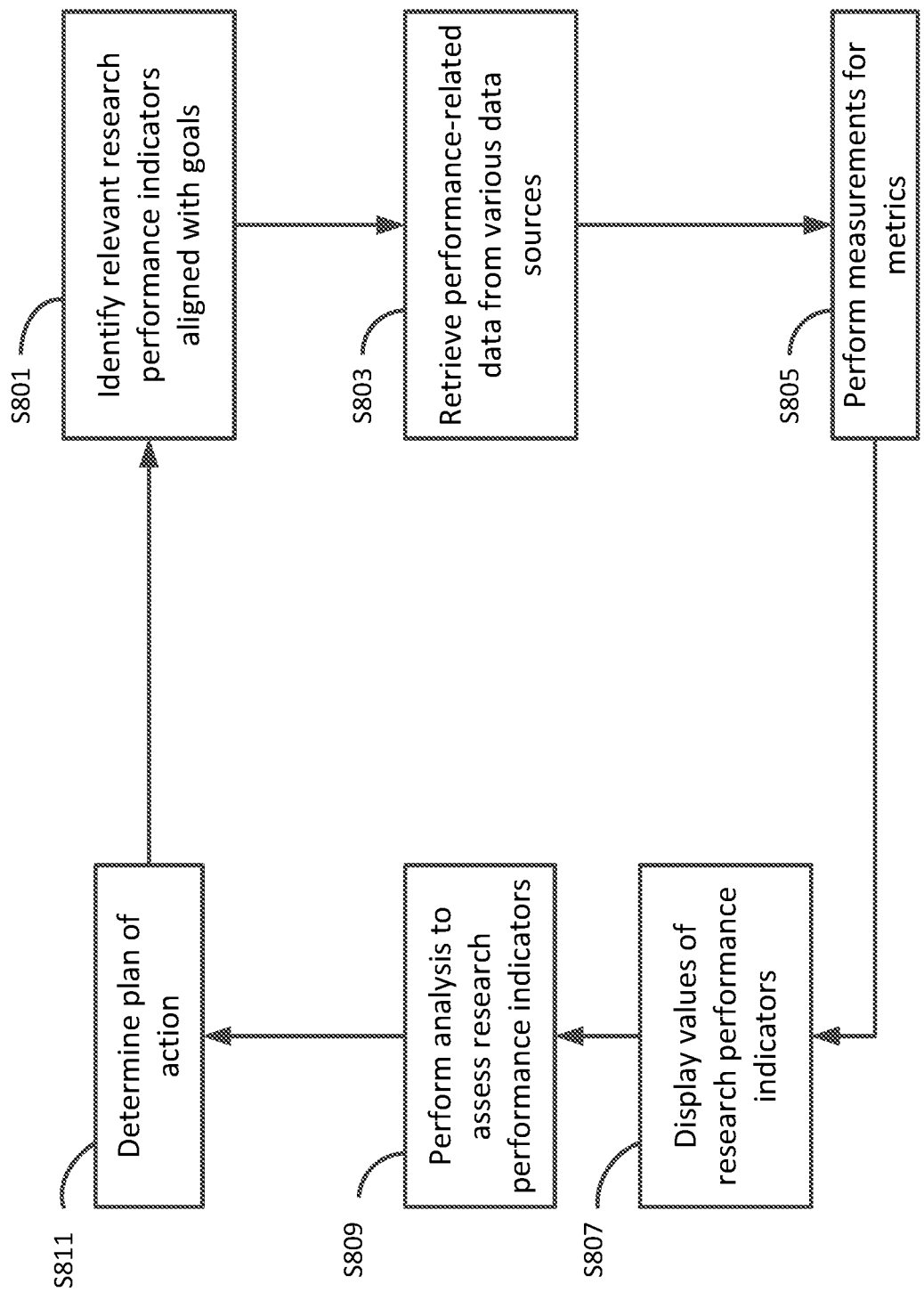
FIG. 8 is a flowchart of an iterative procedure for identifying key performance indicators in accordance with an exemplary aspect of the disclosure.

FIG. 8 is flowchart of an iterative procedure of identifying research performance indicators in accordance with an exemplary aspect of the disclosure. In S801, an initial set of research performance identifiers may be selected. Research performance indicators may be selected by an administrator of a research institute to align with goals and objectives of the organization. Research performance indicators may also be selected by a department manager. In all cases, standard definitions 703 are provided for each of the research performance indicators so that all stakeholders interpret research performance indicators in a consistent manner. Research performance indicators are preferably selected based on data that can be measured objectively.

In university research institutes, research performance indicators typically include: total expenditures;
total research support;
number of patents awarded;
number of patent applications filed;
royalty and license income;
total externally supported research;
number of income-generating licenses;
number of grant submissions;
grant revenue generated;
cost of a research assistant.

In S803, performance-related data that ay be used to determine the respective research performance indicator may be retrieved from various data sources.

In S805, any measurements that are needed for performance metrics may be performed. For example, there may be several research assistants assigned to a research project and the research assistants may have different levels of experience and background. A metric may be the number of research assistants assigned to a research project, or the number of research assistants employed in a department.

The obtained metrics may be used to track research performance indicators. In S807, results of the measurements and other performance-related data may be accessed and displayed for stakeholders.

In S809, analysis may be made of the research performance indicators based on the measurements and other performance-related data to determine if the tracked research performance indicators are sufficient measures of whether the organization's and/or department's goals are being achieved.

Analysis can shed light on the data that have been tracked. An organization, for example, might find out that the time to approval is increasing because of an influx of a large number of trials at the site, which would necessitate looking at the staff allocation ratio and improving it. Alternatively, an organization might learn that the increasing timeframe is due to numerous back-and-forth messages and incomplete submission packages, which, in turn, would call for action in improving the process for submission.

Another likely explanation is that the overall number is skewed because of a specific process instituted for early-phase studies, which would call for a closer look at that new process. Having the information available at one's fingertips helps identify the exact problem area and takes the guesswork out of it. Furthermore, timely action and ongoing monitoring of research performance indicators ensure that an organization can show improvement.

In one embodiment, analysis may be performed using the stored performance-related data in order to determine an effect of the performance-related data for the research programs on the research performance indicator values, including whether a change in a research performance indicator would bring a lowest performing research program (i.e., one with a lowest value of a research performance indicator) e with a majority of other of the research programs.

In S811 an appropriate plan of action can be taken for improving data to be collected and refining research performance indicators. The research performance indicators may be constantly monitored. Through the timely implementation of findings, continuous improvements can be made. In particular, in S811, research performance indicators may be revised to better align with goals.

Figure 9:
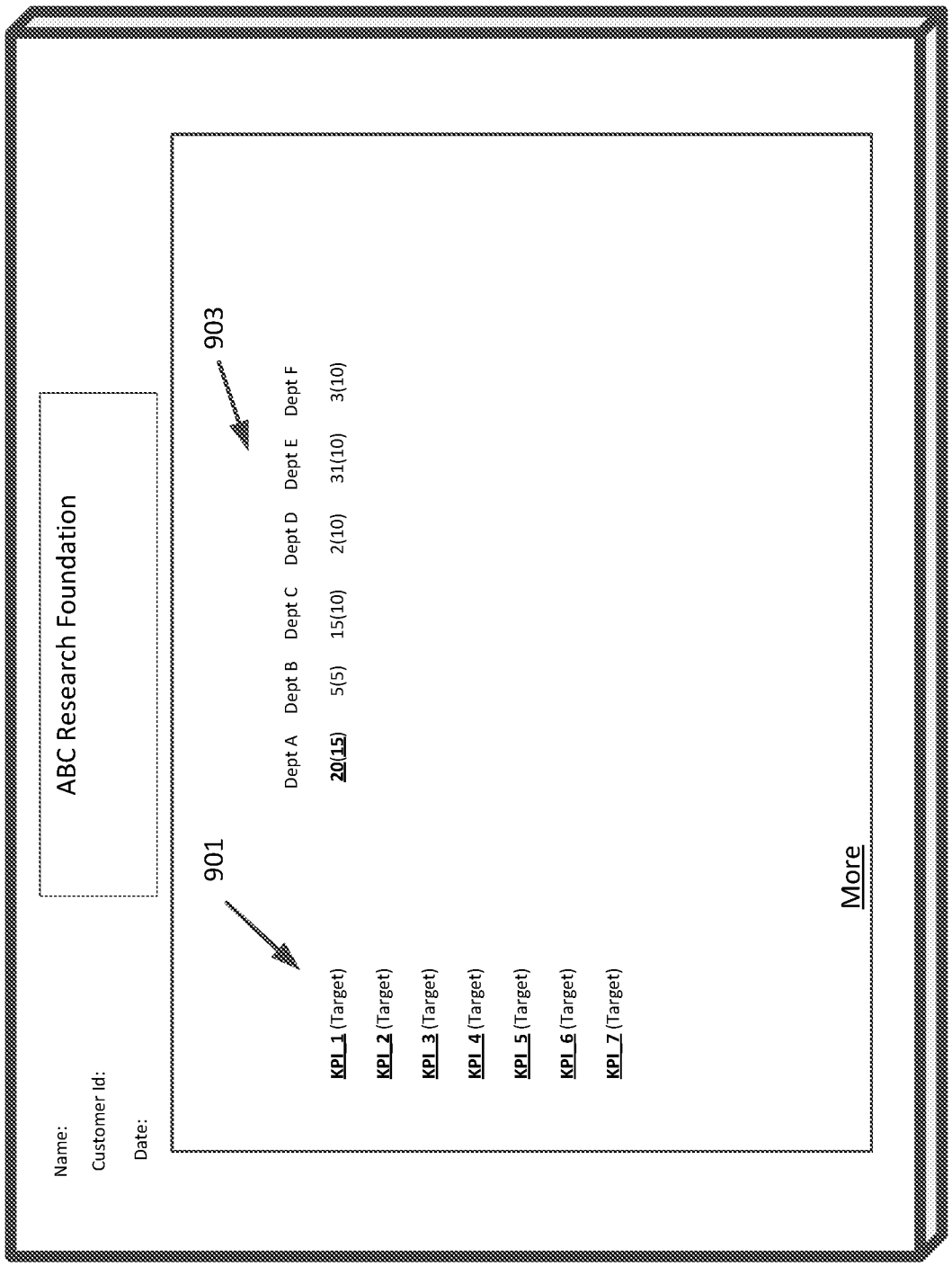
FIG. 9 is a display interface for the iterative procedure in accordance with an exemplary aspect of the disclosure.
Figure 10:
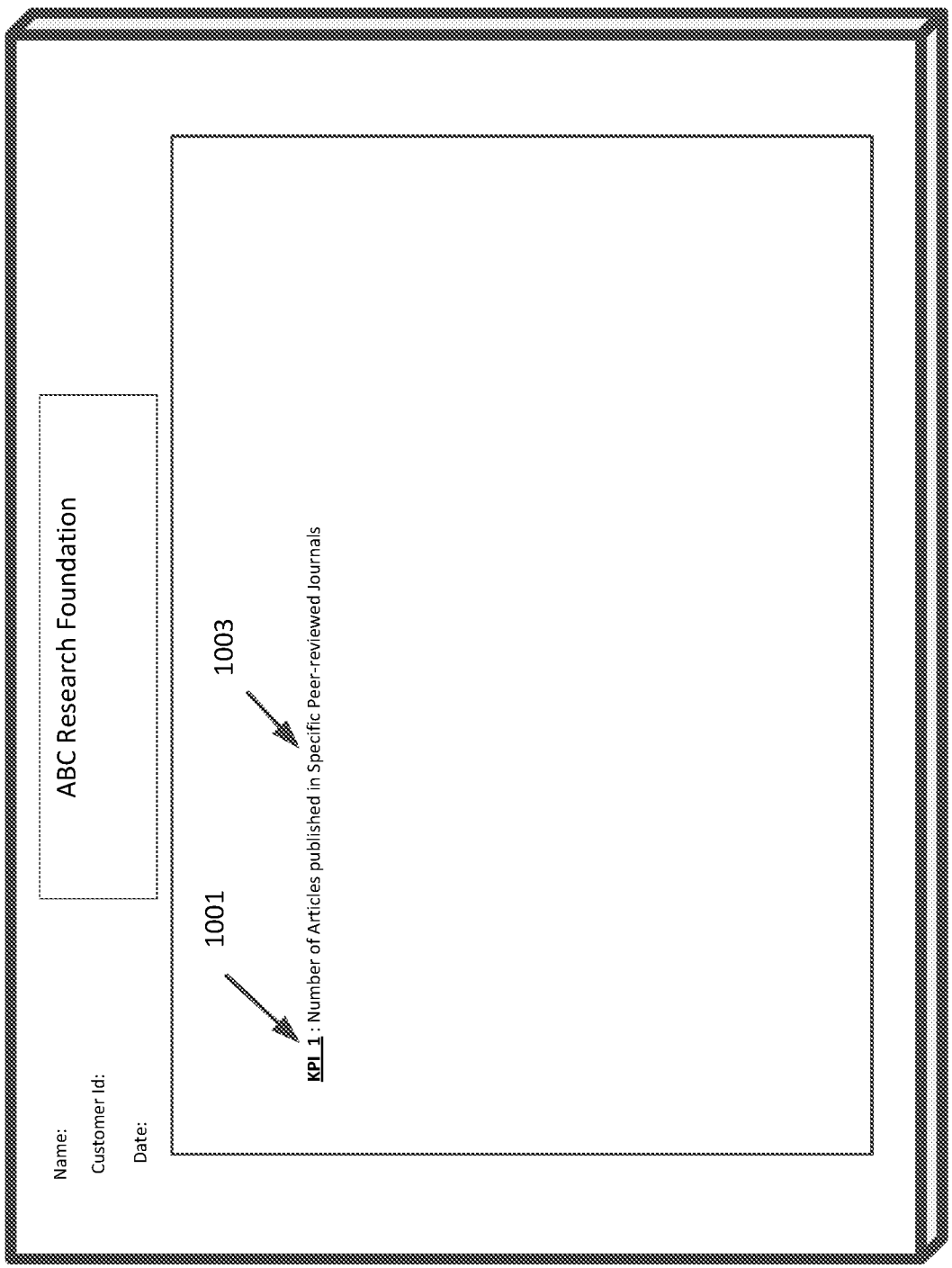
FIG. 10 is a display interface for the iterative procedure in accordance with an exemplary aspect of the disclosure.

FIG. 9 is a display interface for the iterative procedure in accordance with an exemplary aspect of the disclosure. An example interface that would accommodate the iterative process of identifying performance indicator of FIG. 8 may include a display, in S807, of values of research performance indicators 901 for each department 903 in a research institute, with associated targets. The interface may be configured with links for the performance indicators that can be followed to obtain the definition of the research performance indictor. The links may also be implemented as popup windows. FIG. 10 is a display interface showing an example of a definition 1003 of a research performance indicator 1001 that would be displayed upon following a link.

Figure 11:
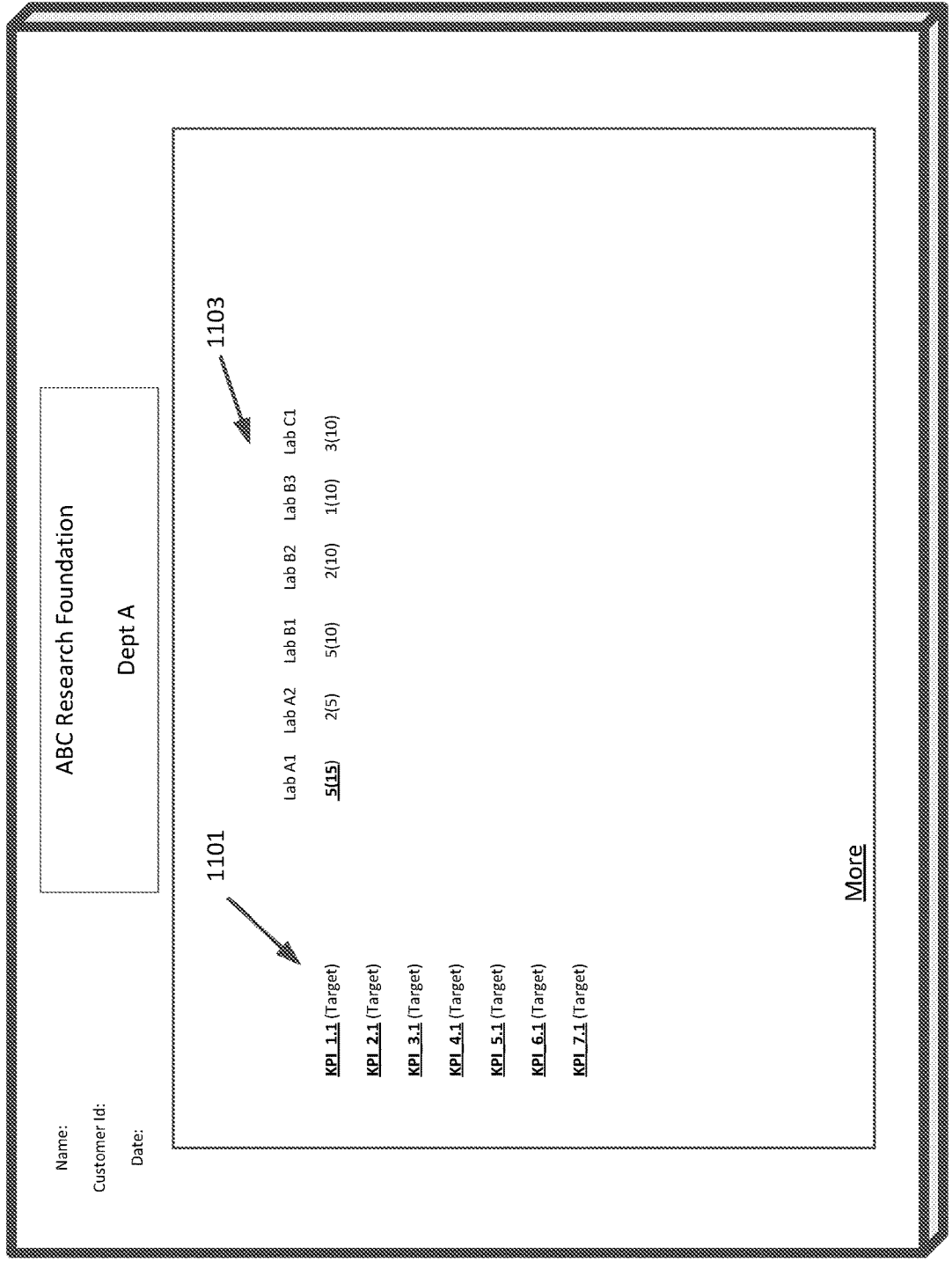
FIG. 11 is a display interface for the iterative procedure in accordance with an exemplary aspect of the disclosure.

FIG. 11 is a display interface for the iterative procedure in accordance with an exemplary aspect of the disclosure. An example interface that would accommodate the iterative process of identifying performance indicators may include a display of values of research performance indicators 1101 at the level of an entity within a department, such as each laboratory 1103, with associated targets.

Figure 12:
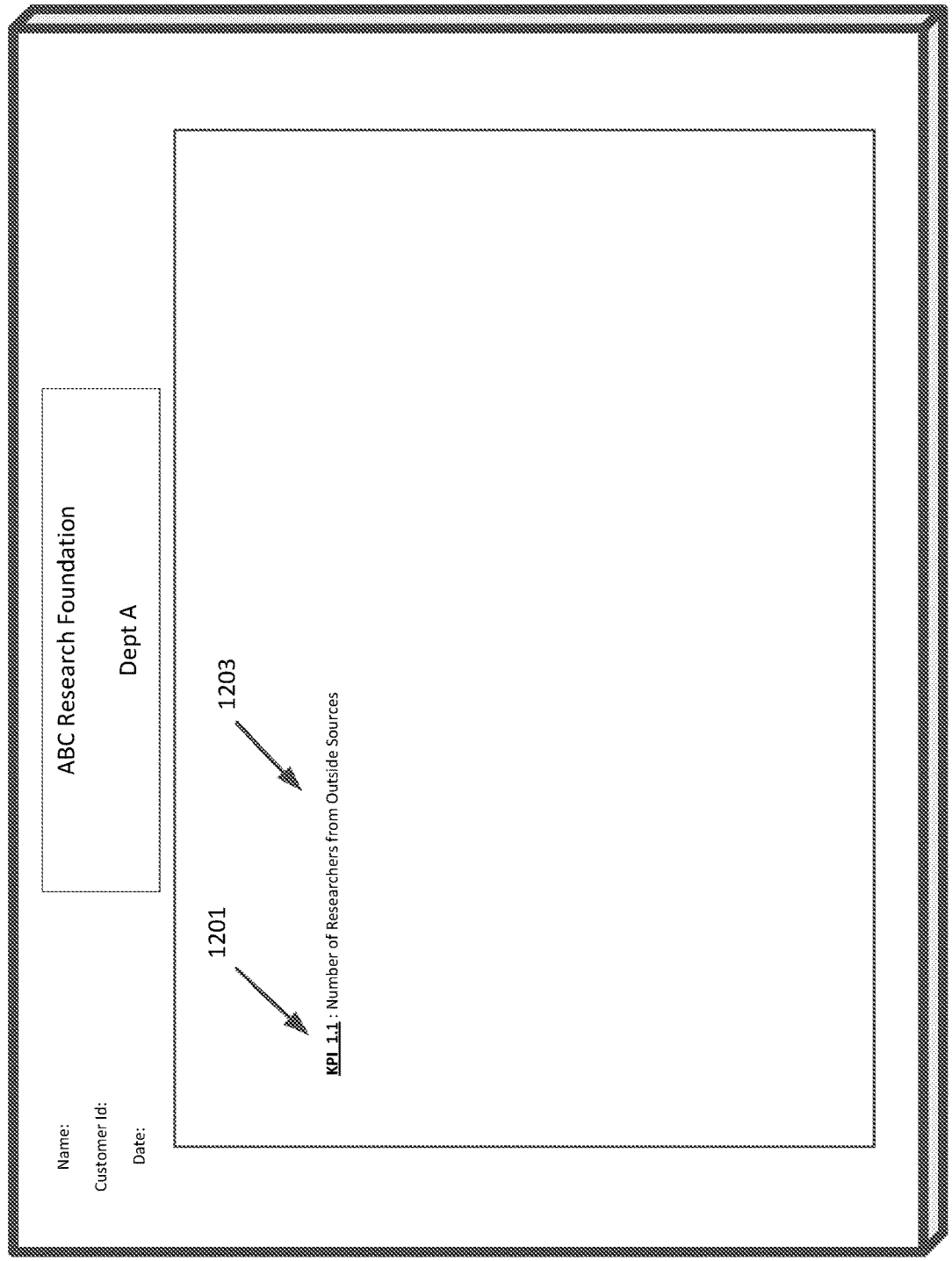
FIG. 12 is a display interface for the iterative procedure in accordance with an exemplary aspect of the disclosure.

Similar to FIG. 10, FIG. 12 is a display interface showing an example of a definition 1203 of a research performance indicator 1201 that would be displayed upon following a link.

Figure 13:
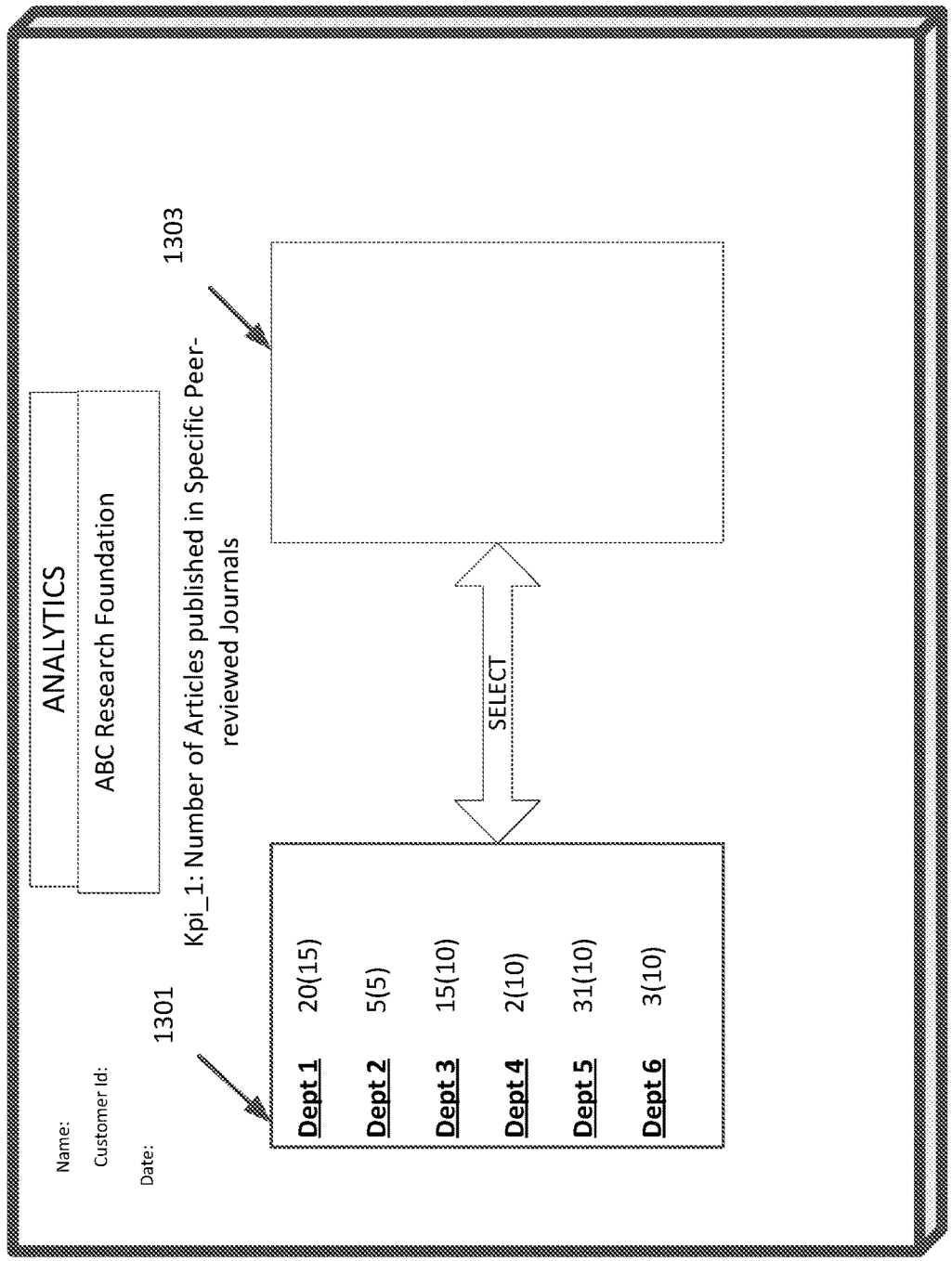
FIG. 13 is a display interface for the iterative procedure in accordance with an exemplary aspect of the disclosure.

FIG. 13 is a display interface for the iterative procedure in accordance with an exemplary aspect of the disclosure. In order to perform analysis, in S809, an interface may be provided that facilitates selection of sections in a research institute, such as departments, that a user may choose for analysis of research performance. The interface may include a list of sections (Departments) 1301 with values for a particular research performance indicator. The sections (Departments) may be selected by, for example, dragging one or more sections (Departments) to a window 1303.

Figure 14:
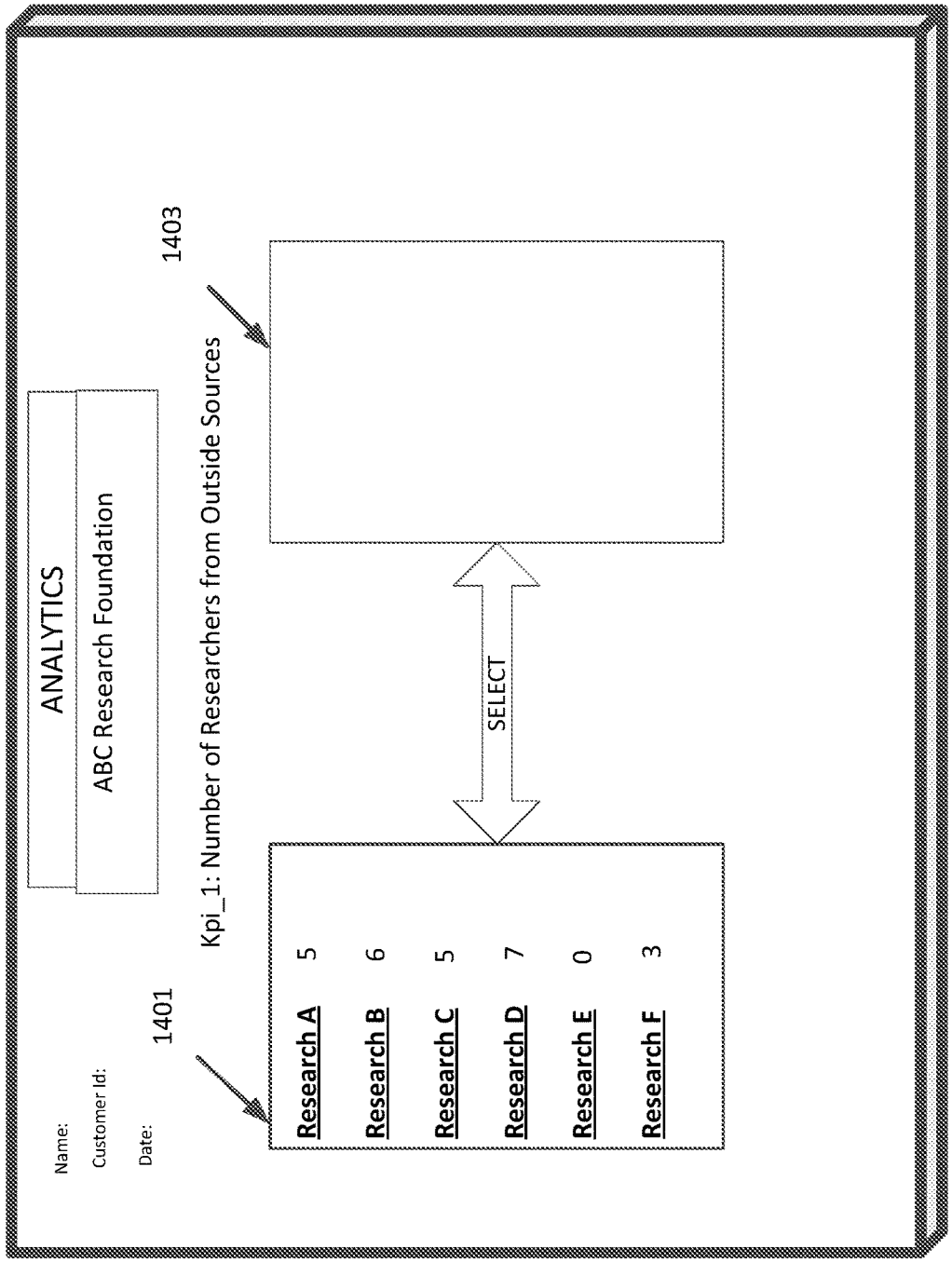
FIG. 14 is a display interface for the iterative procedure in accordance with an exemplary aspect of the disclosure.

FIG. 14 is a display interface for the iterative procedure in accordance with an exemplary aspect of the disclosure. At another level, an interface may be provided that facilitates selection of research projects for comparison based on a particular research performance indicator. The interface may include a list of research projects 1401 with associated values of the research performance indicator and a window 1403 where research projects could be dragged to select them for analysis.

The analysis may be for the purpose of determining reasons for differences in performance between departments or particular research projects. The analysis may involve determining totals of specific data items, performing statistical analysis of the data items, inferring knowledge from the data items. The data may be obtained from various distributed sources. For example, data from other research programs may be analyzed. Data from all programs in a department may be consolidated and analyzed.

Figure 15:
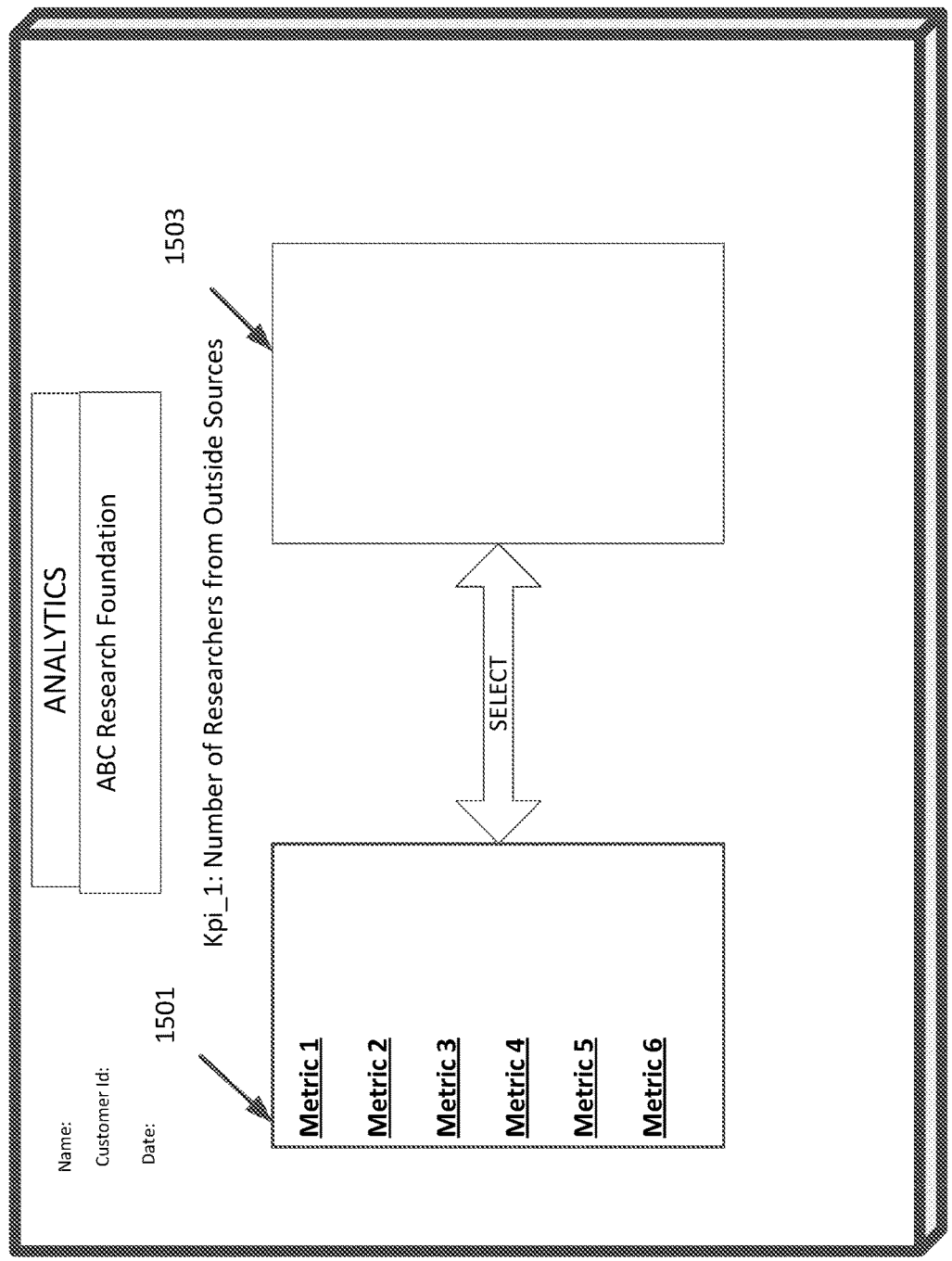
FIG. 15 is a display interface for the iterative procedure in accordance with an exemplary aspect of the disclosure.

FIG. 15 is a display interface for the iterative procedure in accordance with an exemplary aspect of the disclosure. In order to analyze reasons for differences, particular metrics may be selected that may attribute to the value of a particular research performance indicator. The interface may include a list of metrics 1501 and a selection window 1503.

Figure 16:
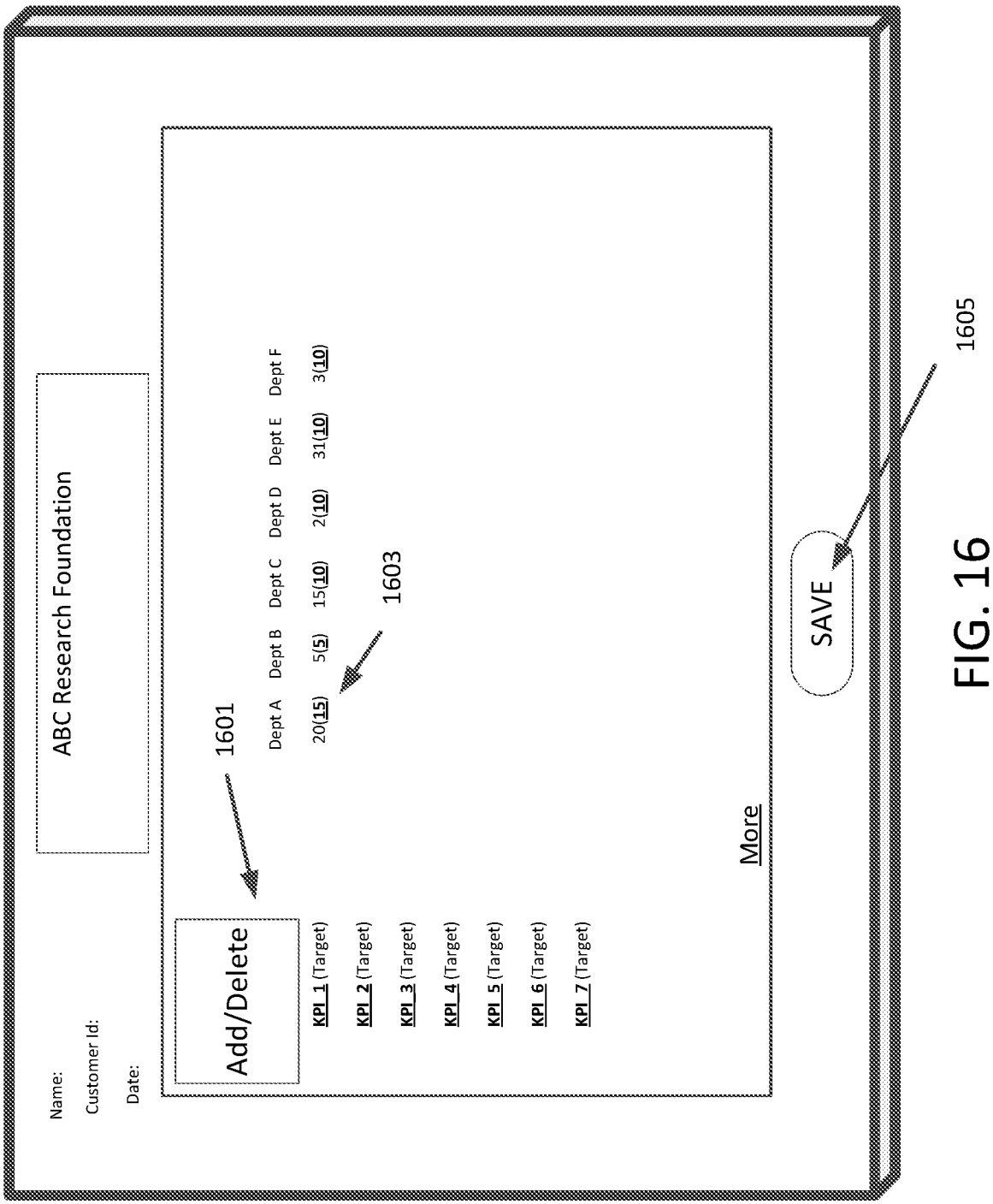
FIG. 16 is a display interface for the iterative procedure in accordance with an exemplary aspect of the disclosure.

FIG. 16 is a display interface for the iterative procedure in accordance with an exemplary aspect of the disclosure. The result of the analysis may serve to make decisions as to revising research performance indicators. Revisions may include changing values of targets for particular performance indicators, and adding or deleting research performance indicators. An example interface that is configured for adding and deleting research performance indicators includes a button 1601 that may be used to add or delete selected research performance indicators for a set of departments 1603. The changes may be saved by a save button 1605.

A research performance indicator is a composite metric that is tied to targets and that indicates how an organization is performing relative to a specific goal and objective. A portfolio of research performance indicators, involving composite and interconnected metrics, helps to improve multiple facets of a research program, including administrative and financial.

The targets associated with research performance indicators may be short range or long range. Research performance indicators may evolve due to the addition of new research, creation or inclusion of new departments, or changes in goals or objectives of the organization or of other levels. Research performance indicators may be reviewed periodically, such as weekly or monthly or yearly. As such, research performance indicators and associated targets may be re-evaluated by way of feedback from department heads and managers.

Figure 17:
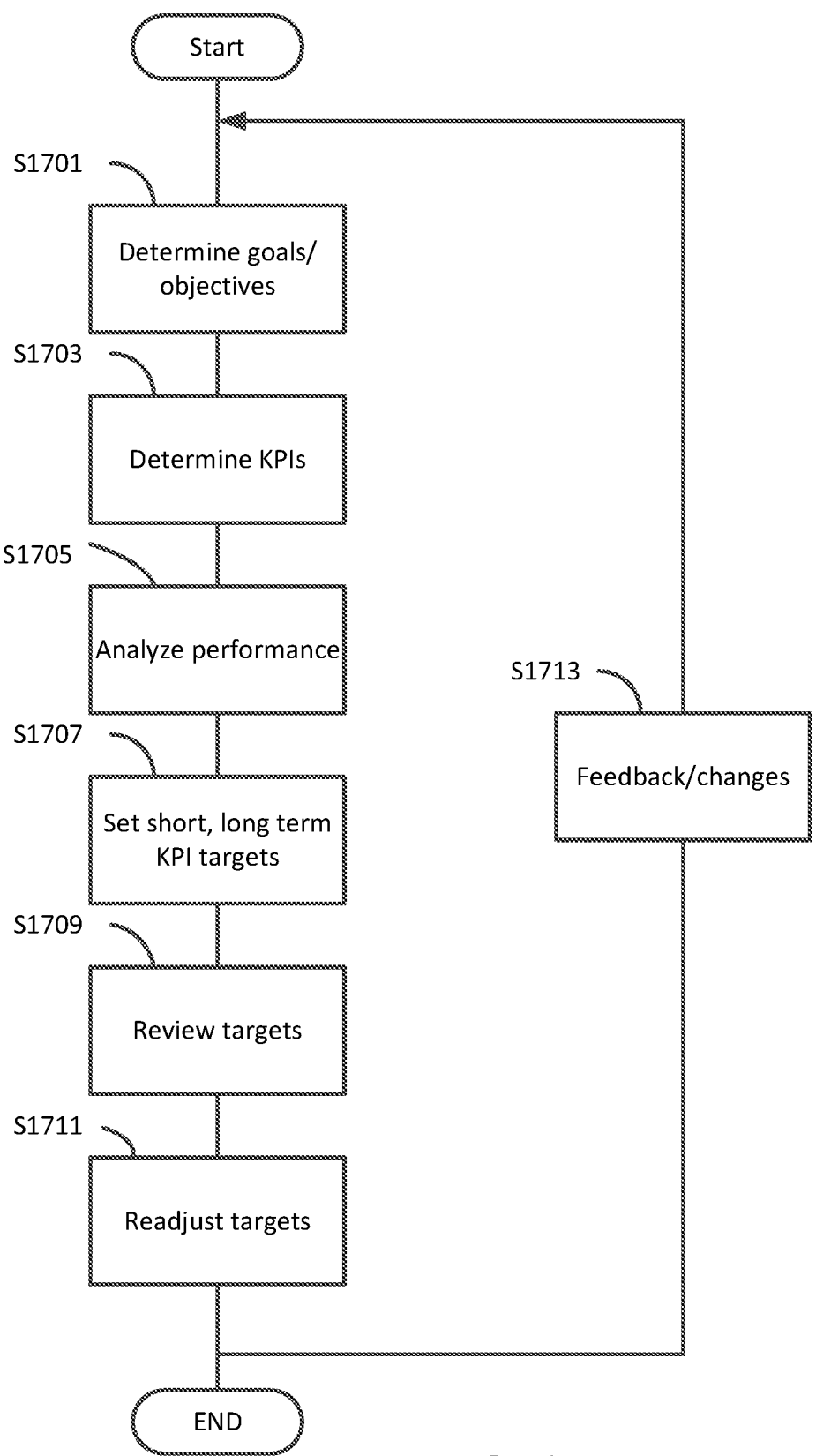
FIG. 17 is a flowchart of an iterative procedure of determining goals and objectives in accordance with an exemplary aspect of the disclosure.

Provided the query and information retrieval subsystem of FIG. 4, administrators of a research organization, department heads and managers may make decisions on revising goals or objectives and well as revising research performance indicators for evaluating achievement of goals or objectives. FIG. 17 is a flowchart of an iterative procedure of assessing research performance indicators for determining achievement of goals and objectives in accordance with an exemplary aspect of the disclosure. In S1701, high level goals and objectives may be defined for an organization, and may later be updated. The goals and objectives may be research-oriented, administrative, or financial. An example research-oriented goal may be to achieve an increase in research publications. However, a goal of increasing the number of research publications may not be an appropriate goal in itself. If an organization wishes to prolong advancement of research, scientific knowledge, and innovation, a goal of increasing the number of research publications may not advance innovation over a long period if the research publications do not lead to an increase in funding for future research, or the cost of research efforts is high, or the number of researchers is high relative to other research programs. Subsequently, goals and objectives may be changed over time.

In S1703, a portfolio of research performance indicators to be used to evaluate whether the initial goals and objectives are being met may be determined. For example, research performance indicators related to increases in research publication may include measures of the number of specific types of publications resulting from a research program or research programs conducted in a department. Provided other goals, such as programs that involve clinical studies, the portfolio of research performance indicators may include failures of a patient's condition or patient withdraws from a study.

Often a research center has several projects being performed based on several sponsors. Each sponsored research activity may be evaluated based on annual total direct costs for research, and annual reimbursed indirect costs. Related research proposal activities may be evaluated based on annual total dollar value of proposals submitted, and annual number of proposals submitted. Center-specific performance indicators may be indicators that reflect center performance relative to the unique aspects of its mission. Center-specific performance indicators may include:

center-supported publications;

students completing degree program in allied majors per year;

maintain laboratory accreditation; and affiliated facility from other colleges that collaborate on proposals each year.

A more general set of research performance indicators may include:

Experimental Time spent per researcher in the research project;

Number of publications;

Number of researchers from outside sources;

Number of external databases searched;

Share of research with third parties;

Amount of financial resources;

Actions taken to produce specific outputs;

Goods and services resulting from the actions; and

Changes that are relevant to the achievement of outcomes.

In S1705, analysis may be performed on data resulting from research programs and research grants. The analysis may involve determining totals of specific data items, performing statistical analysis of the data items, inferring knowledge from the data items. The data may be obtained from various distributed sources. For example, data from other research programs may be analyzed. Data from all programs in a department may be consolidated and analyzed.

Short-term key performance indicators may include short-term or medium-term effects of the outputs, e.g., number of references to a publication;

Long-term key performance indicators may include long-term effects of the outputs, e.g., number of peer reviewed publications in specific scientific fields.

In S1707, short and/or long term performance targets may be set based on the analysis. Targets may include values for research performance indicators that are based on totals of data items. A short term target may include the number of successful patients within a certain number of months, or other intermediate data point. A long term target may be the number of scientific publications or publications in certain peer-reviewed journals. Other targets may include values for composite metrics.

In S1709, the targets may be reviewed to determine if they may be too high or too low. A review of the targets may reveal that some research performance indicators may not be appropriate and that new research performance indicators may be needed.

In S1711, the targets may be adjusted based on the results of the review. Target values may be adjusted by increasing or decreasing their values. Targets may be adjusted by removing or adding new targets.

In S1713, feedback may be obtained from department heads and managers ranging from whether research performance indicators are appropriate measures to whether performance indicators need to be completely changed or that goals and objectives of an organization require re-evaluation.

Typically eligible users may access an analytics platform, and use the resulting information according to their privileges. This information can be of many forms. The user of the analytics platform may provide feedback by rating the protocol that is used to analyze performance and achievement of research performance indicators. Such rating would depend on factors such as the usefulness of the protocol, the clarity of its description, etc. This rating information is then processed by the system to develop a rating and a later ranking for this protocol. Rating and ranking of protocols is useful to give later users of the protocol a sense of how "tried and tested" the protocol is.

In the case of multi-disciplinary research, the data for research performance indicators may come from various sources. Local and remote databases may be accessed, and the databases can include proprietary databases and non-proprietary databases. Documents stored in these databases may include content elements such as text, diagrams, images, and direct collaborative links (with others). The databases can store resources such as text books, bibliographic resources and journals or user provided databases (among others), that are searchable by the query and information retrieval sub-system. Advantageously, the system may be customized for a particular field of endeavor. For example, in an embodiment of the system tailored to the general engineering field, the databases may include searchable resources including text books, bibliographic resources, journals, engineering databases, national or local laboratory guidelines, evidence-based engineering resources, policy information, procedure information, and educational information (among others).

The different research activities of a large/complex institute tend to be interrelated with one another. For example, multidisciplinary research is shared among different units (research centers and academic departments). Thus, these activities and the associated outcomes are related to one another through their contributions and used resources.

Likewise, detailed insights and informed decisions may be realized by identifying the research performance indicators of various institutional entities.

Figure 18:
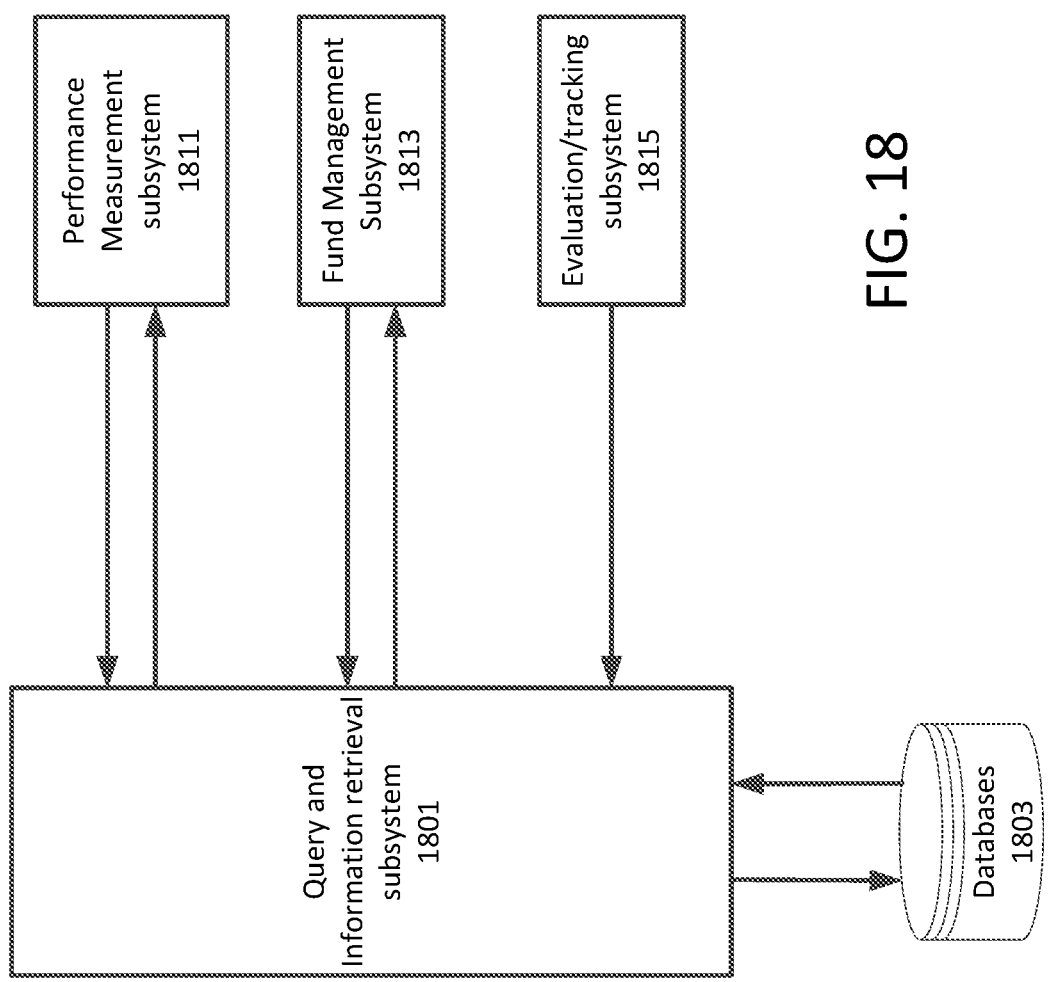
FIG. 18 is a flowchart of a process for retrieving detailed information from independent heterogeneous databases in accordance with an exemplary aspect of the disclosure.

FIG. 18 is a diagram of a system for retrieving detailed information from independent heterogeneous databases in accordance with an exemplary aspect of the disclosure. Search queries may be made by sponsors, stakeholders, research principals, or department administrators to databases 1803 by way of a query and information retrieval subsystem 1801. The system includes a research project performance management subsystem 1811, a research grant subsystem 1813, and a research tracking subsystem 1815.

In some embodiments, a dashboard may provide "detailed insights" that allows higher administrators to view the analysis of different types of funded projects (such as internally funded projects, externally funded projects, and collaboration-based projects). The context of the "detailed insights" dashboard depends upon the user role, for instance, the university president can view the insight of overall organization, while the dean can browse the insights related to his/her college and the chairman for his/her department/center. Moreover, this dashboard is available at the individual level where the researcher can view his/her research items over years with different attributes.

Figure 19:
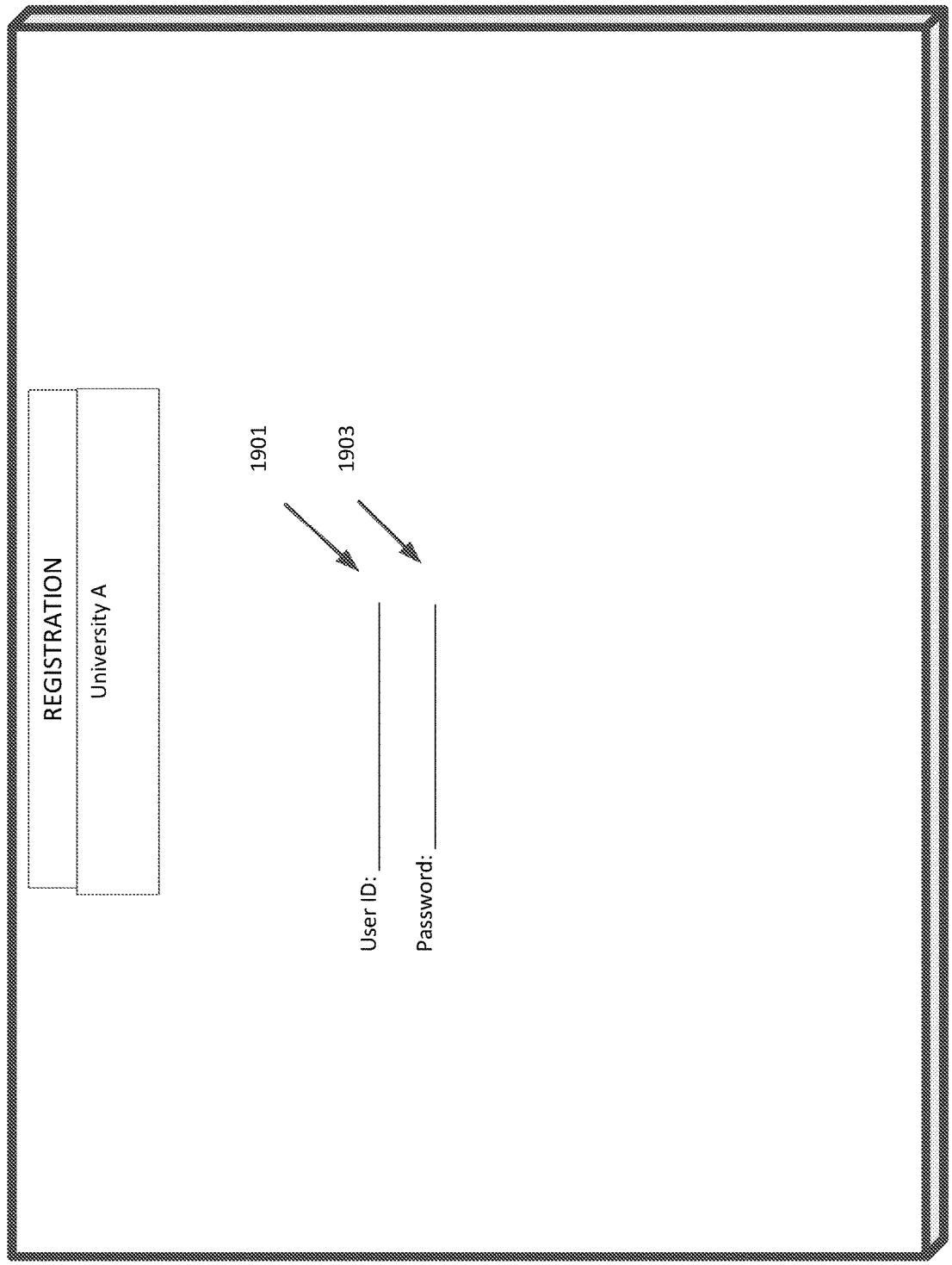
FIG. 19 is a display interface for the dashboard for initial authentication in accordance with an exemplary aspect of the disclosure.
Figure 20:
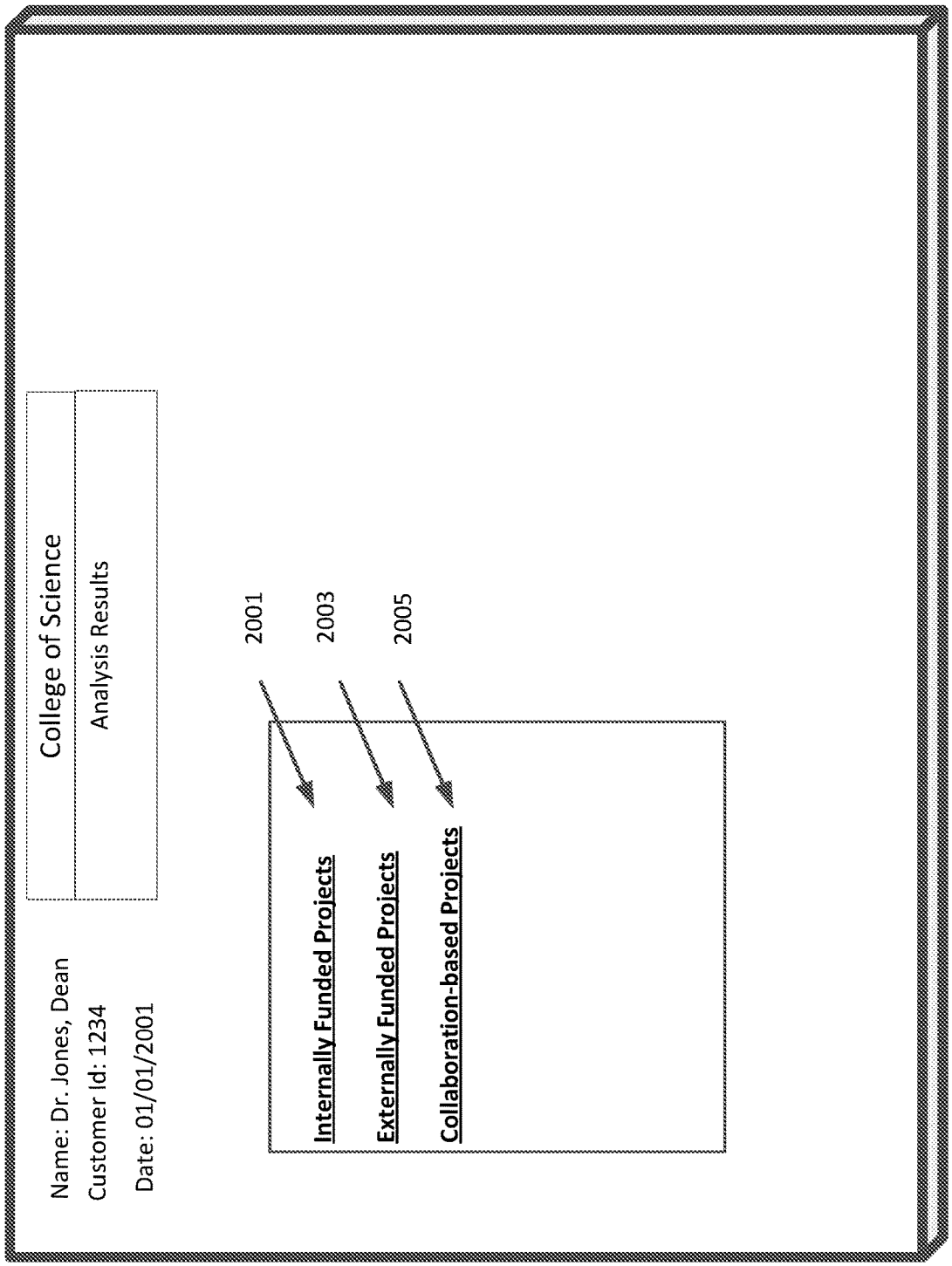
FIG. 20 is a display interface for the dashboard for a college level in accordance with an exemplary aspect of the disclosure.
Figure 21:
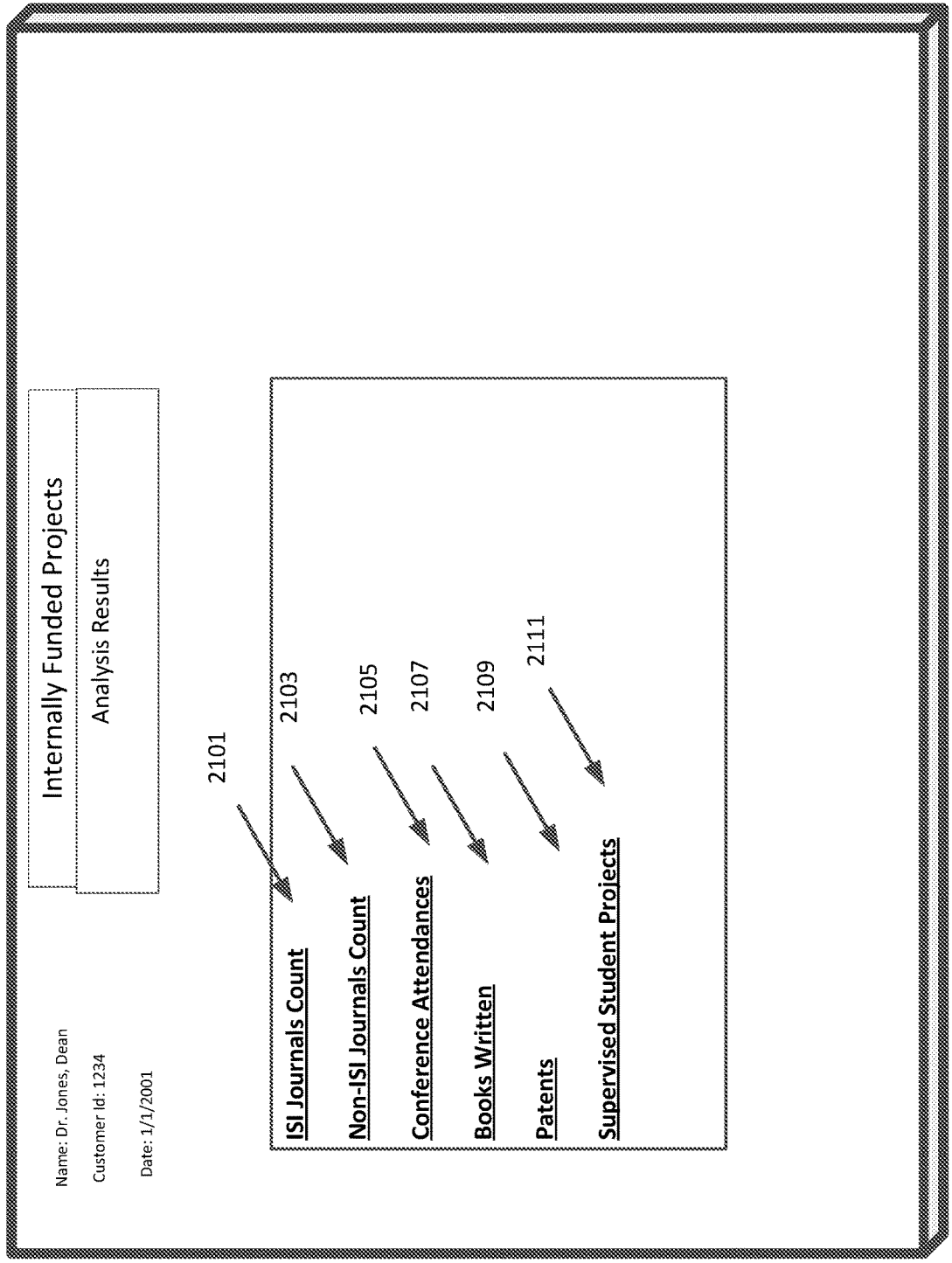
FIG. 21 is a display interface for the dashboard for internally funded projects in accordance with an exemplary aspect of the disclosure.

FIG. 19 is a display interface for the dashboard in accordance with an exemplary aspect of the disclosure. To begin, a user will enter authentication information such as a user ID 1901 and a password 1903. The system may use the authentication information to take the user to the appropriate level. FIG. 20 is a display interface that a user may be taken to when the user role is a dean of a college, for example College of Science. The display interface may include links for analysis results for internally funded projects 2001, externally funded projects 2003, and collaboration-based projects 2005. FIG. 21 is a display interface provided when a user selects the link for internally funded projects. In one embodiment, the display interface for internally funded projects may include links to analysis results including ISI journals count 2101, non-ISI journals count 2103, conference attendances 2105, books written 2107, patents 2109, and supervised student projects 2111.

Figure 22:
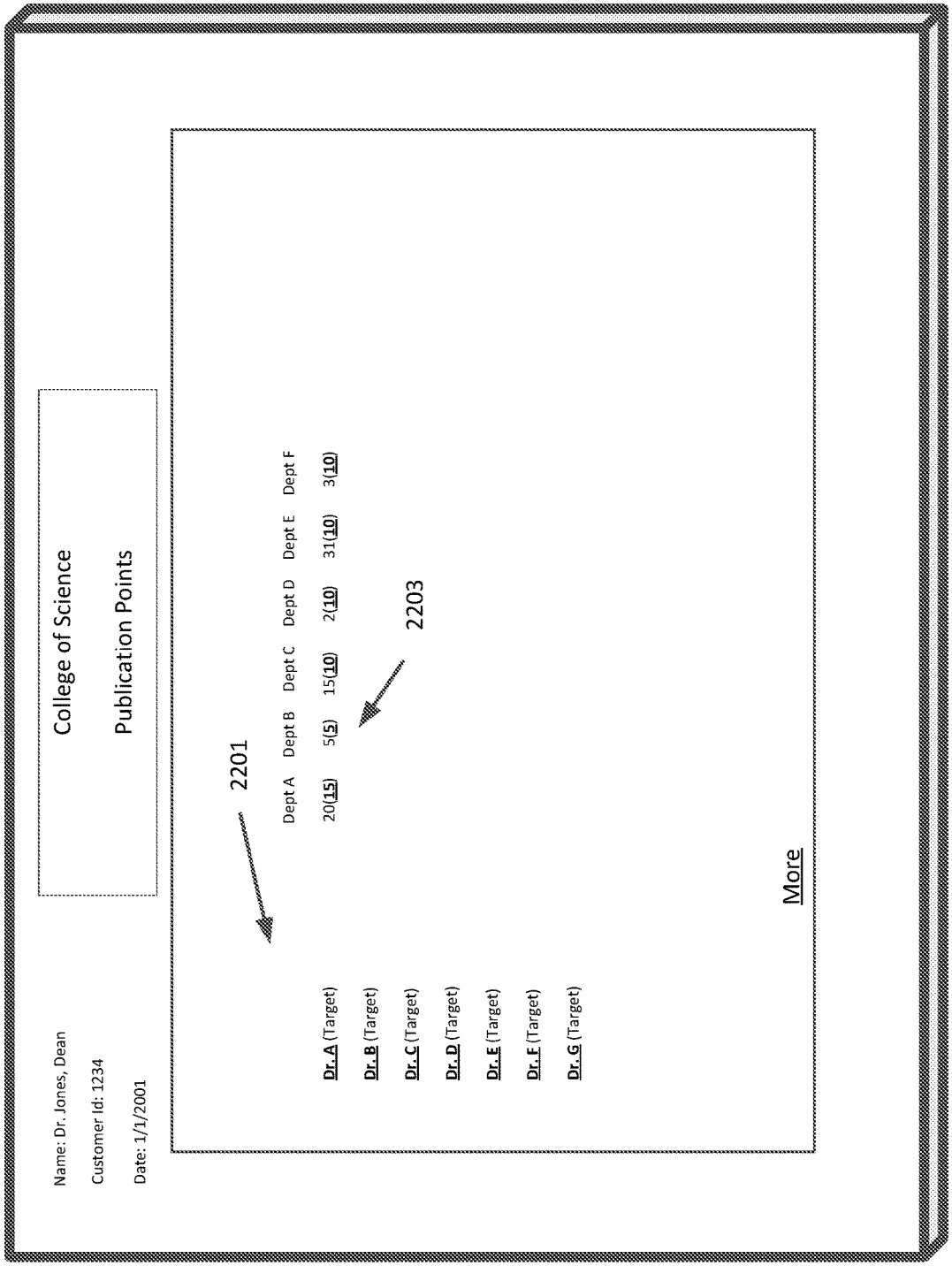
FIG. 22 is a display interface for the dashboard for publication points in accordance with an exemplary aspect of the disclosure.

In some embodiments, researchers that are authors will accumulate publication points. FIG. 22 is a display interface for publication points for researchers in a college, such as College of Science. The rationale behind the publication pints is to measure the contribution of researcher in the published articles not only the count his/her involvement. If it is a single author paper, the single author gets the full credit. In case of having two authors of the paper, then each author gets half of the credit (0.5). For the papers having more than two authors, the first author gets (0.5) while the rest of authors get 0.25 each. In one embodiment, researchers 2201 may be listed to show their respective publication points 2203 broken out by particular departments or projects.

In some embodiments, the metrics and other analysis results may be displayed using various analyses options including charts/graphs, statistics, comparative results for the approved projects, their types, status, and budget over a period, such as a year or several years.

Figure 23:
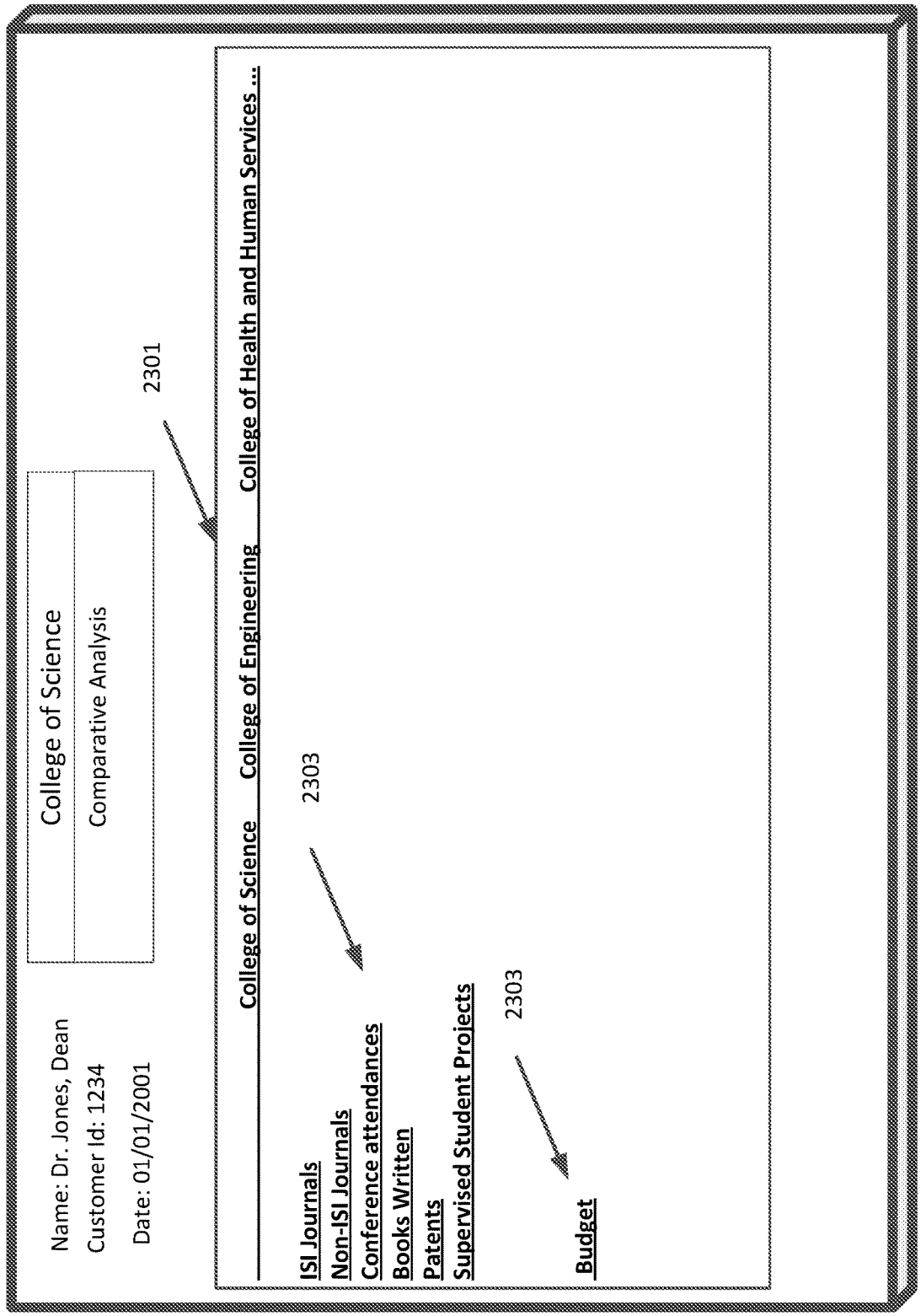
FIG. 23 is a display interface for the dashboard for comparative analysis in accordance with an exemplary aspect of the disclosure.

The dashboard may provide information of various forms of comparative analysis. In some embodiments, the dashboard may provide a comparative analysis for the distribution of projects among the different colleges, departments and research centers. FIG. 23 is a display interface for a comparative analysis between different colleges that may be provided to a dean of one of the colleges. The dashboard may provide analysis results for various metrics 2303 for each college 2301. The dashboard may also include budget information for each college. In one embodiment, the dashboard may also provide different analyses for the ISI publications and conference attendances at different levels, such as University, College, Department. These analyses help the higher administration in identifying the overall performance with respect to various categories and provide historical data for comparison.

Figure 24:
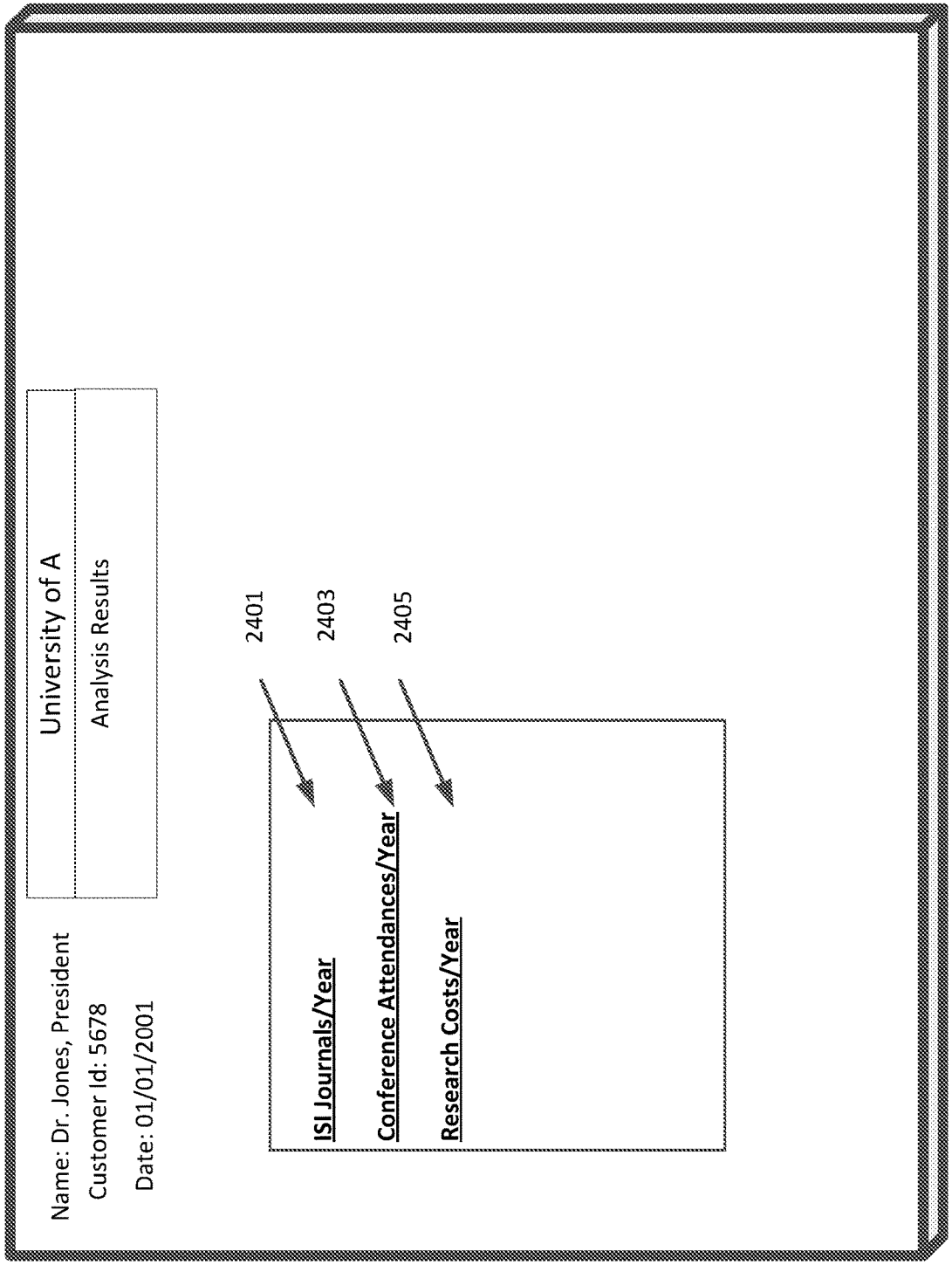
FIG. 24 is a display interface for the dashboard for university level in accordance with an exemplary aspect of the disclosure.

FIG. 24 is a display interface for the dashboard for a case where the user is a University President. In one embodiment, the dashboard for the University President may include university-wide analysis results, such as ISI journals per year 2401, conference attendances per year 2403, and research costs per year 2405.

Figure 25:
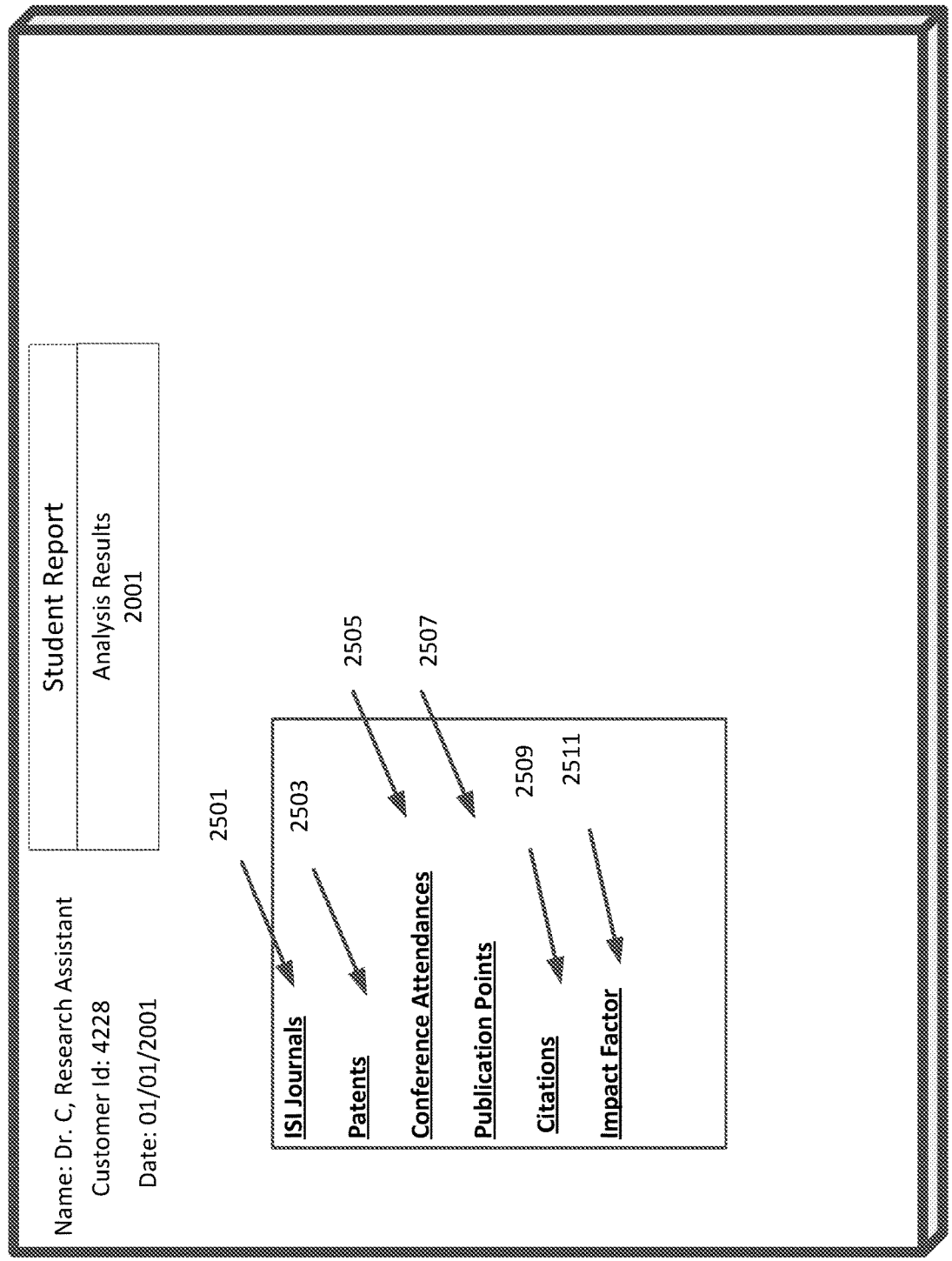
FIG. 25 is a display interface for the dashboard for researcher level in accordance with an exemplary aspect of the disclosure.

The dashboard may be for an individual researcher. A researcher can view his/her research items. FIG. 25 is a display interface for the dashboard for a case where the user is a researcher. The analysis report may include the number of ISI Journal publications 2501, the number of patents 2503, the number of conference attendances 2505, the researcher's publication points 2507, the overall number of citations 2509, and an overall impact factor 2511. An impact factor may also be associated with categories including specific ISI Journals, patents and conferences, for example, based on the number of citations in each of these categories.

The system may also be accessed and used by external users (outside the organization) to search for experts in different research areas. The system may also automatically generate a collaborative researcher network analysis using the authorship provided in his/her journal publications and patents. This feature contributes to the generation of knowledge and expertise to support potential collaboration activities, evaluation system, academic production analysis, and post-graduation program monitoring and evaluation.

Figure 26:
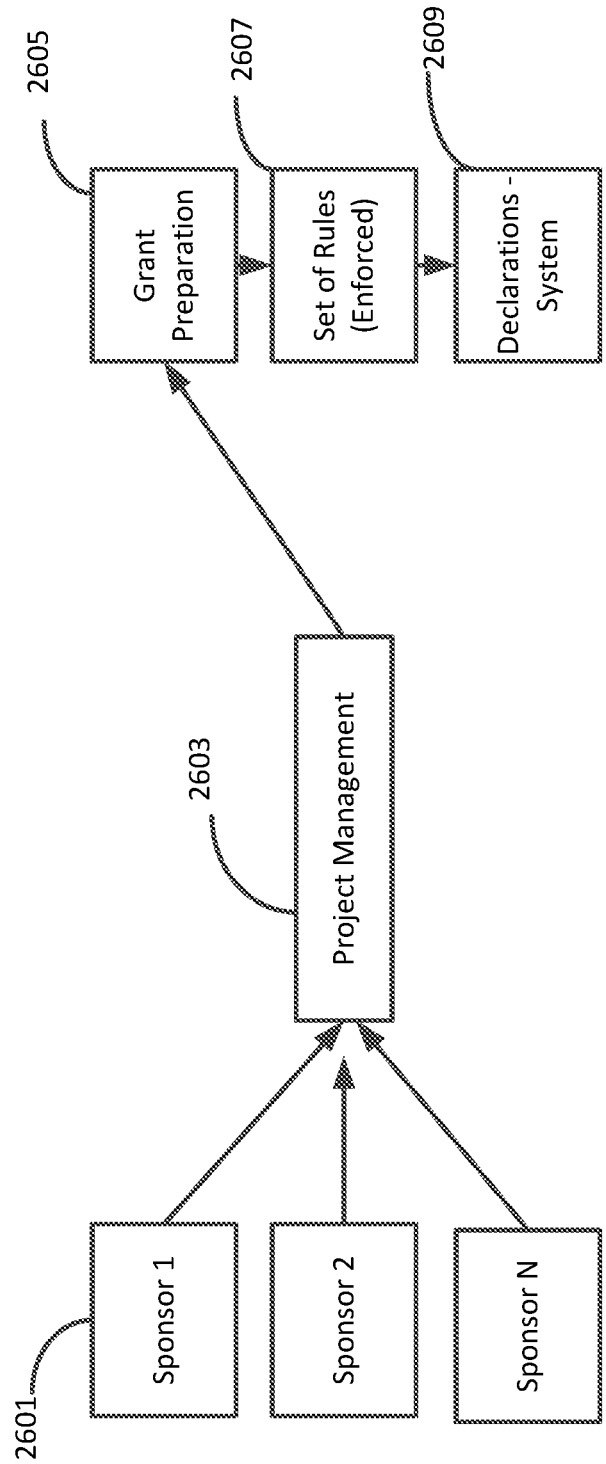
FIG. 26 is a block diagram of a research funding management module in accordance with an exemplary aspect of the disclosure.

FIG. 26 is a flow-chart representation of the research financial support module for the research grant subsystem 1813. Sponsors 2601 may be provided with a query environment 1801 to view research center 607 and department 609 data. In addition, each sponsor 2601 may access a consistent project management module 2603 for grant preparation 2605. Once a grant is prepared, the grant will include a set of rules 2607 to be enforced. The financial support system will perform the grant award 2609.

Figure 27:
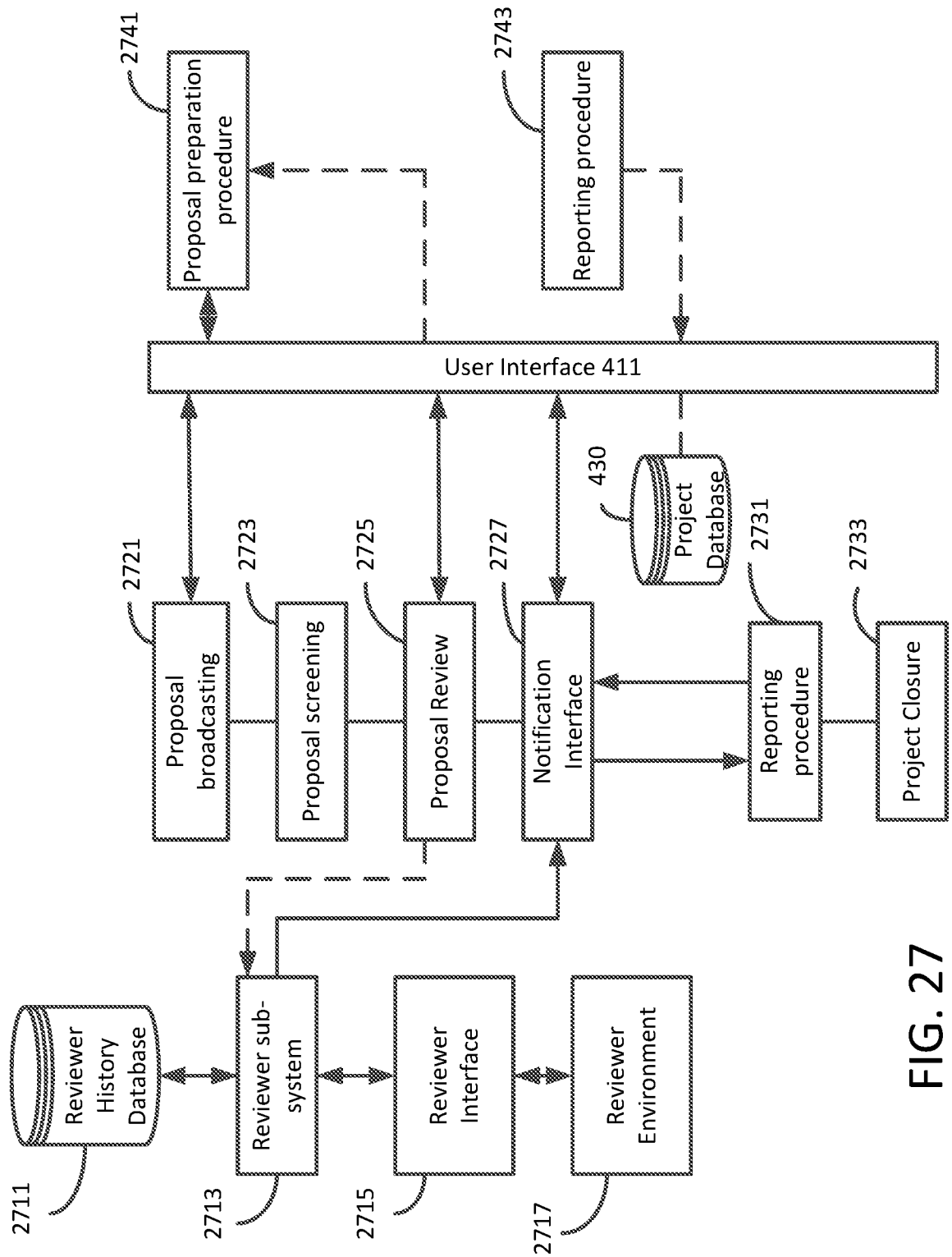
FIG. 27 is a flow diagram of a research project evaluation tracking system in accordance with an exemplary aspect of the disclosure.

FIG. 27 demonstrates a schematic flow-diagram representation of the research project evaluation and tracking system 1815. The invention also includes a method of managing the scientific research projects. The method includes, in 2741 receiving first research proposals from a researcher of a research center by way of the User Interface 411. In 2721, proposals are broadcasted and screened in 2723. Unlimited types of grants can be maintained in the system. The research proposal details and files are stored in the scientific knowledge database 430. A request is accepted a responsible officer when the information is transmitted, 2725, to the officer via a reviewer subsystem 2713. A workstation incorporating the reviewer subsystem 2713 may include a reviewer interface 2715 within a reviewer environment 2717. Modified proposal versions may be requested, 2727, from the reviewer. The modified first proposal information is incorporated into the scientific knowledge database, 430, as second proposal information. As the project is being performed, the researcher may follow a reporting procedure 2743. The reviewer may be informed of the project through the same reporting procedure 2731, until the end of the project. Project closure is performed in 2733.

In some embodiments, different reports are generated by the system as performance indicators that can be utilized by higher administration for the purpose of evaluation and promotion. These reports may include:

1. Productivity Report: which is a key research performance indicator report that lists the performance of researchers via several metrics (such as ISI Journals count, publication points, non-ISI Journals count, conference attendances, books, patents, supervised student, projects, and others) for a timespan provided by the user.
2. Publication Summary analysis report: which shows researchers performance with respect to the research outcomes and impact (including the citation and impact factor) over a timespan provided by the user. This analysis can be shown at different levels either, institutional, unit or individual. This report also provides benchmarking to compare the performance of the researcher with his/her partners in the same field of research.

3. Department/Center KPI analysis report shows the yearly breakdown of count and impact of ISI articles, patents and conferences for a unit and the organization as well. This analysis report highlights the contribution of each unit (department/center) towards the university performance.

Numerous modifications and variations of the present invention are possible in light of the above teachings. It is therefore to be understood that within the scope of the appended claims, the invention may be practiced otherwise than as specifically described herein.

The invention claimed is:

1. A Web-based research organization analytics system, comprising:
   at least one client computer system configured with a Web browser;
   at least one Web server in communication with the client computer system via Internet;
   at least one database server, connected to the Internet, maintaining at least one database, the at least one database maintaining research performance indicators;
   a query environment layer that is executed in the Web browser, the query environment layer comprising a first graphical user interface, a second graphical user interface, and an access control module,
   the access control module is configured to allow high level generic data stored in the at least one database to be accessed through the first graphical user interface for a first set of users, having a first authorization level, and a second level of detailed data to be accessed through the second graphical user interface for a second set of users, having a second authorization level that is higher than the first authorization level;
   an applications layer that is executed by the at least one Web server, the application layer comprising
   an external interface module that is configured as an interface for a non-proprietary database of the at least one databases, and
   an API access module that is configured to perform a translation of queries either in the first graphical user interface or in the second graphical user interface to queries that are recognizable in a proprietary database of the at least one databases and perform a search operation in the proprietary database in accordance with the queries,
   the at least one Web server is configured to:
      identify targets associated with the research performance indicators that are aligned with goals associated with a research organization,
      map performance-related data from various data sources to an integrated database scheme and store in the at least one database the performance related data,
      calculate research metrics based on the performance-related data,
      determine values of the research performance indicators using the metrics,
      display to the client computer system the research performance indicator values and associated targets,
      perform analysis using the stored performance-related data in order to determine an affect of the performance-related data for the research programs on the research performance indicator values,
      display to the client computer system a third graphical user interface for adjusting the research performance indicators and the associated targets based on the analysis, and
      adjust the research performance indicators and the associated targets.

2. The Web-based research organization analytics system of claim 1, wherein the at least one Web server is further configured to
   retrieve the performance-related data from the at least one database and calculate metrics for each of a plurality of research programs,
   determine the research performance indicator values using the metrics,
   display to the client computer system research performance indicator values,
   perform analysis using the stored performance-related data in order to determine an affect of the performance-related data for the research programs on the research performance indicator values, including whether a change in a research performance indicator would bring a lowest performing research program in line with a majority of other of the research programs,
   display the third graphical user interface for adjusting the research performance indicators, and
   adjust the research performance indicator targets to bring the lowest performing research program in line with the majority of the other of the research programs.

3. The Web-based research organization analytics system of claim 1, wherein adjusting the research performance indicators includes inserting a new research performance indicator.

4. The Web-based research organization analytics system of claim 1, wherein adjusting the research performance indicator includes dividing a research performance indicator by a total cost to obtain a cost efficiency performance indicator.

5. The Web-based research organization analytics system of claim 1, wherein the at least one Web server is configured to:
   identify research performance indicators aligned with goals associated with each level in multiple levels of the research organization,
   retrieve the performance-related data from various data sources and calculate the metrics,
   determine research performance indicator values for each of the levels using the metrics, and
   display to the client computer system the research performance indicator values organized by each of the levels of the research organization.

6. The Web-based research organization analytics system of claim 5, wherein a level of the research organization is a department level, wherein the at least one Web server is further configured to retrieve performance-related data from various data sources including other organizations that perform the same research and calculate the metrics,
   display to the client computer system research performance indicator values and associated target values for the research programs in the department,
   perform analysis using the stored performance-related data in order to determine an affect of the performance-related data for the research programs of the department on the research performance indicator values using the performance-related data from the other organizations, including whether a change in a research performance indicator would bring a lowest performing research program in the department in line with a majority of other of the research programs, display the third graphical user interface for adjusting the research performance indicators and the targets, and adjust the research performance indicators and the associated targets to bring the lowest performing research program in line with the majority of the other of the research programs.

7. The Web-based research organization analytics system of claim 1, wherein the at least one Web server is further configured to display to the client computer system a first display including information indicating research personnel associated with a research program, for a first set of users having a first level of access, and to display to the client computer system a second display including information indicating research performance, for a second set of users having a second level of access of higher authorization than the first level of access.

8. The Web-based research organization analytics system of claim 1, wherein the at least one Web server is further configured to display a research proposal at the client computer system, obtain a response indicting whether or not a research proposal is approved, and report organizational tasks during the research program in accordance with the research proposal and storing the reported tasks as the performance-related data.

9. The Web-based research organization analytics system of claim 1, wherein the at least one Web server is further configured to display an environment for designing a research grant, including a set of rules, wherein the set of rules includes performance requirements and associated research performance indicators, wherein the performance requirements include an expected outcome and an amount of funding, and wherein the research performance indicators include an outcome.

10. The Web-based research organization analytics system of claim 1, wherein the at least one Web server is further configured to display a graphical user interface that displays research performance indicators associated with each level of the research organization.

11. A method for a Web-based research organization analytics system, the Web-based research organization analytics system comprising:

at least one client computer system configured with a Web browser;

at least one Web server in communication with the client computer system via Internet;

at least one database server, connected to the Internet, maintaining at least one database, the at least one database maintaining research performance indicators;

a query environment layer that is executed in the Web browser, the query environment layer comprising a first graphical user interface, a second graphical user interface, and an access control module, the access control module is configured to allow high level generic data stored in the at least one database to be accessed through the first graphical user interface for a first set of users, having a first authorization level, and a second level of detailed data to be accessed through the second graphical user interface for a second set of users, having a second authorization level that is higher than the first authorization level;

an applications layer that is executed by the at least one Web server, the application layer comprising an external interface module that is configured as an interface for a non-proprietary database of the at least one databases, and an API access module, the method comprising:

translating queries either in the first graphical user interface or in the second graphical user interface to queries that are recognizable in a proprietary database of the at least one databases and performing a search operation in the proprietary database in accordance with the queries, identifying targets associated with the research performance indicators that are aligned with goals associated with a research organization;

mapping, by the at least one Web server, performance-related data from various data sources to an integrated database scheme and storing in the at least one database the performance related data;

calculating, by the at least one Web server, research metrics based on the performance-related data;

determining, by the at least one Web server, values of the research performance indicators using the metrics;

displaying to a client computer system the research performance indicator values and the associated targets;

performing, by the at least one Web server, analysis using the stored performance-related data in order to determine an affect of the performance-related data for the research programs on the research performance indicator values;

displaying to the client computer system an interface for adjusting the research performance indicators and the targets based on the analysis; and adjusting, by the at least one Web server, the research performance indicators and the associated targets.

12. The method of claim 11, further comprising:

retrieving, by the at least one Web server, the performance-related data from the at least one database and calculating metrics for each of a plurality of research programs;

determining, by the at least one Web server, the research performance indicator values using the metrics;

displaying to the client computer system research performance indicator values;

performing analysis using the stored performance-related data in order to determine an affect of the performance-related data for the research programs on the research performance indicator values, including whether a change in a research performance indicator would bring a lowest performing research program in line with a majority of other of the research programs;

displaying the third graphical user interface for adjusting the research performance indicators; and adjusting, by the at least one Web server, the research performance indicator targets to bring the lowest performing research program in line with the majority of the other of the research programs.

13. The method of claim 11, wherein the adjusting the research performance indicators includes inserting a new research performance indicator.

14. The method of claim 11, wherein the adjusting the research performance indicator includes dividing a research performance indicator by a total cost to obtain a cost efficiency performance indicator.

15. The method of claim 11, further comprising:
- identifying, by the at least one Web server, research performance indicators aligned with goals associated with each level in multiple levels of the research organization;
- retrieving, by the at least one Web server, the performance-related data from various data sources and calculate the metrics;
- determining, by the at least one Web server, research performance indicator values for each of the levels using the metrics; and
- displaying to the client computer system the research performance indicator values organized by each of the levels of the research organization.

16. The method of claim 15, wherein a level of the research organization is a department level, the method further comprising:
- retrieving performance-related data from various data sources including other organizations that perform the same research and calculate the metrics;
- displaying to the client computer system research performance indicator values and associated target values for the research programs in the department;
- performing analysis using the stored performance-related data in order to determine an affect of the performance-related data for the research programs of the department on the research performance indicator values using the performance-related data from the other organizations, including whether a change in a research performance indicator would bring a lowest performing research program in the department in line with a majority of other of the research programs;
- displaying the third graphical user interface for adjusting the research performance indicators and the targets; and
- adjusting, by the at least one Web server, the research performance indicators and the associated targets to bring the lowest performing research program in line with the majority of the other of the research programs.

17. The method of claim 11, further comprising displaying to the client computer system a first display including information indicating research personnel associated with a research program, for a first set of users having a first level of access, and displaying to the client computer system a second display including information indicating research performance, for a second set of users having a second level of access of higher authorization than the first level of access.

18. The method of claim 11, further comprising:
- displaying a research proposal at the client computer system;
- obtaining a response indicting whether or not a research proposal is approved; and
- reporting organizational tasks during the research program in accordance with the research proposal and storing the reported tasks as the performance-related data.

19. The method of claim 11, further comprising:
- displaying an environment for designing a research grant, including a set of rules,
- wherein the set of rules includes performance requirements and associated research performance indicators,
- wherein the performance requirements include an expected outcome and an amount of funding, and
- wherein the research performance indicators include an outcome.

20. The method of claim 11, further comprising:
- displaying a graphical user interface that displays research performance indicators associated with each level of the research organization.

* * * * *